(12) United States Patent
Kayama

(10) Patent No.: US 8,305,600 B2
(45) Date of Patent: Nov. 6, 2012

(54) INFORMATION PROCESSING APPARATUS AND ITS CONTROL METHOD

(75) Inventor: Hiroyuki Kayama, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1597 days.

(21) Appl. No.: 11/217,024

(22) Filed: Aug. 31, 2005

(65) Prior Publication Data
US 2006/0044612 A1   Mar. 2, 2006

(30) Foreign Application Priority Data

Aug. 31, 2004 (JP) ................................. 2004-252900
Aug. 5, 2005 (JP) ................................. 2005-228477

(51) Int. Cl.
*G06F 3/12* (2006.01)
*G06K 15/00* (2006.01)

(52) U.S. Cl. ..................... 358/1.15; 358/1.13; 358/1.14; 358/1.16; 358/1.17; 358/1.18

(58) Field of Classification Search ......... 358/1.11–1.18
See application file for complete search history.

(56) References Cited

U.S. PATENT DOCUMENTS

| | | | |
|---|---|---|---|
| 6,348,971 B2 * | 2/2002 | Owa et al. ..................... | 358/1.15 |
| 6,687,018 B1 * | 2/2004 | Leong et al. .................. | 358/1.15 |
| 6,850,336 B1 | 2/2005 | Purvis et al. | |
| 7,031,014 B2 * | 4/2006 | Ohwa ........................... | 358/1.18 |
| 7,158,938 B2 * | 1/2007 | Labbe et al. ..................... | 705/5 |
| 2001/0015817 A1 * | 8/2001 | Adachi .......................... | 358/1.15 |
| 2002/0194417 A1 * | 12/2002 | Suzuki et al. .................. | 710/305 |
| 2003/0098990 A1 * | 5/2003 | Nakamura .................... | 358/1.14 |
| 2003/0133146 A1 * | 7/2003 | Parry ........................... | 358/1.15 |
| 2004/0046992 A1 * | 3/2004 | Mori et al. .................... | 358/1.15 |
| 2004/0136023 A1 * | 7/2004 | Sato ............................. | 358/1.13 |
| 2004/0179230 A1 | 9/2004 | Kitada | |

FOREIGN PATENT DOCUMENTS

| | | |
|---|---|---|
| JP | 09-218764 A | 8/1997 |
| JP | 10-240459 | 9/1998 |
| JP | 2000-067062 A | 3/2000 |
| JP | 2000-305734 A | 11/2000 |
| JP | 2001-159966 A | 6/2001 |
| JP | 2001-306655 A | 11/2001 |
| JP | 2002-268846 A | 9/2002 |
| JP | 2004-192357 A | 7/2004 |
| JP | 2004-220565 A | 8/2004 |

OTHER PUBLICATIONS

The above references (1-6) were cited in a Jul. 12, 2010 Japanese Office Action, which is not enclosed, that issued in Japanese Patent Application No. 2005-228477. The above references were cited in a Nov. 15, 2010 Japanese Office Action, a copy of which is enclosed without English Translation, that issued in Japanese Patent Application No. 2005-228477.

* cited by examiner

*Primary Examiner* — Marivelisse Santiago Cordero
*Assistant Examiner* — Huo Long Chen
(74) *Attorney, Agent, or Firm* — Cowan, Liebowitz & Latman, P.C.

(57) ABSTRACT

An information processing apparatus which manages operation schedules of printing devices. The operation schedules of the printing devices are stored, and unoccupied times of the printing devices are detected as candidate times based on the operation schedules. Then, processible data amounts in the respective candidate times are estimated, and candidate times or combinations of candidate times having the sum of estimated processible data amounts greater than the amount of document data to be print-outputted are retrieved. Then, the retrieved candidate times or combinations of candidate times are presented, for selection of desired candidate time or combination of candidate times.

6 Claims, 29 Drawing Sheets

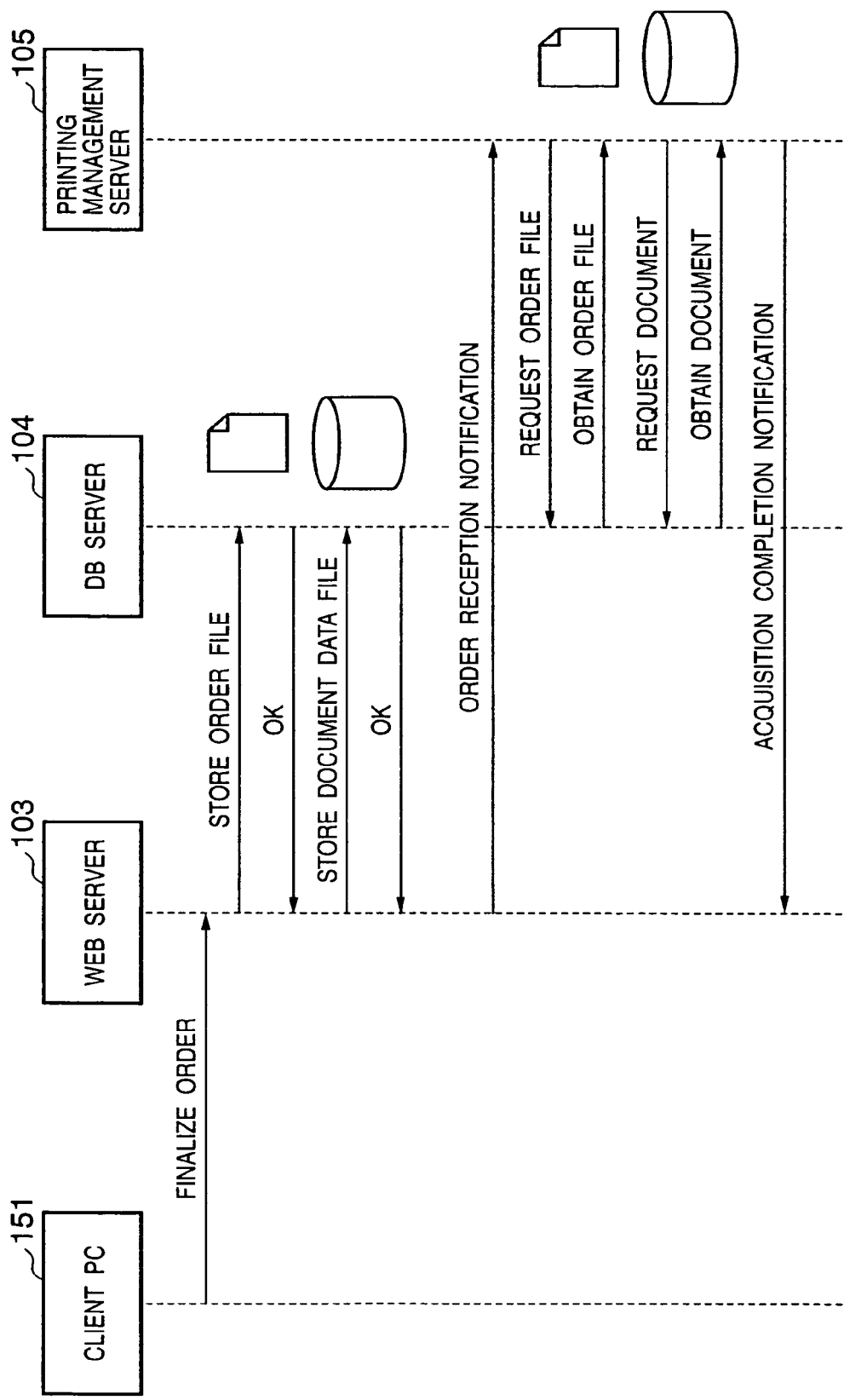

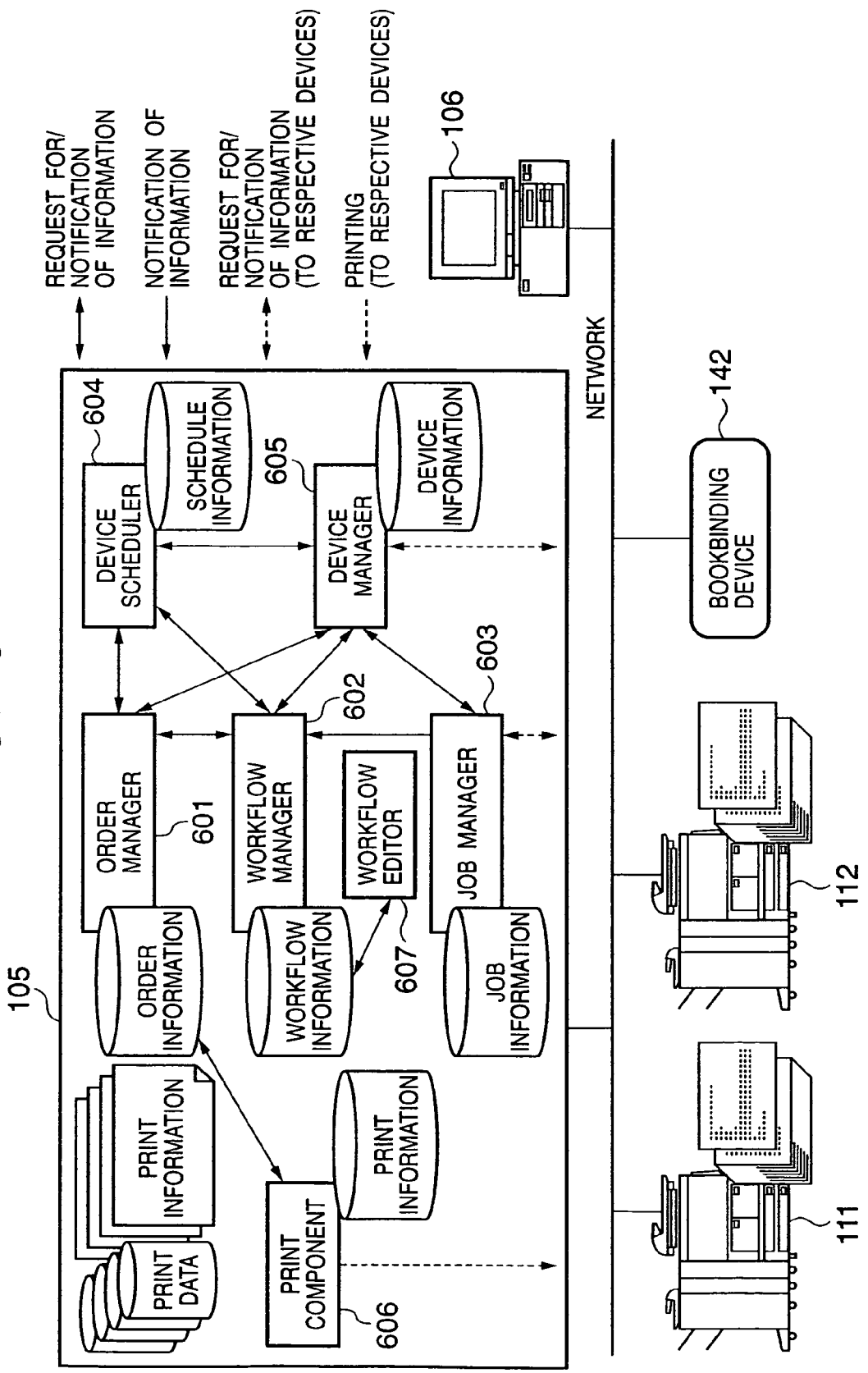

FIG. 7

| ORDER MANAGER | | | | | | □ ⊡ ⊠ |
|---|---|---|---|---|---|---|
| FILE(F) DISPLAY(V) SETTING(S) ORDER(O) | | | | | | |
| DISPLAY LIST(D) | PROCESSED ORDER ▼ | USER VIEW SELECTION | FULL ▼ | LOG-IN USER | KATO | |
| ORDER REFERENCE NAME | ORDER ID | PERSON RESPONSIBLE | PROCESSING STATUS | | | EXPECTED DELIVERY DATE |
| ⊞ ⦿ STANDARD TEST PATTERN | 00000005 | | PERSON RESPONSIBLE UNASSIGNED | | | |
| ⌊☐ SUB ORDER 001 | so001 | | | | | |
| ⊞ ⦾ SPECIFICATION | 00000011 | | WAIT FOR ESTIMATION APPROVAL | | | 2003/05/25 |
| ⌊☐ SUB ORDER 001 | so001 | | | | | |
| ⊞ ⦿ MEDIA-INSERTED PATTERN | 00000020 | | PERSON RESPONSIBLE UNASSIGNED | | | |
| ⊞ ⦿ SPECIFICATION 2 | 00000022 | | ORDER FINALIZED | | | 2003/05/05 |

701

BASIC INFORMATION | DELIVERY INFORMATION

▥ ESTIMATION | ☒ REFUSAL OF ACCEPTANCE | ✉ MAIL TO CLIENT | ☐ CONNECT SERVER | ☑ ORDER COMPLETED | CHANGE PERSON RESPONSIBLE ▼ | ↻ UPDATE

[ORDER INFORMATION]
ORDER ID: 00000005
ORDER NAME: STANDARD TEST PATTERN MATERIAL
NUMBER OF SUB ORDERS: 1
DATE OF ORDER: 2003-04-07T09:25:15
REQUESTED DELIVERY DATE:
EXPECTED DATE OF SHIPMENT:
REQUESTED ITEM:
[CLIENT INFORMATION]
NAME OF ORDERER: KANEKO
ADDRESS:
ZIP:
TEL:
E-MAIL:

702

[MEMO] IN PRODUCTION

INPUT SCHEDULE CONDITION          DELIVERY DUE TIME : 200X/XX/XX 16:00

- ⦿ START TIME  [ 08 ] : [ 00 ]
- ⦿ COMPLETION TIME  [ 14 ] : [ 00 ]
- ⦿ SCHEDULE WITH 1 PRINTER
- ○ SCHEDULE WITH PLURAL PRINTERS
    - ○ SCHEDULE WITH SAME-TYPE PRINTERS
    - ○ SCHEDULE WITH COLOR AND MONOCHROME PRINTERS

SELECT SCHEDULE DISPLAY ORDER

- ⦿ DISPLAY FROM EARLIEST PRINT COMPLETION TIME
- ○ DISPLAY FROM LEAST NUMBER OF PRINTERS
- ○ DISPLAY FROM MOST FREQUENTLY USED PRINTER

[ OK ]   [ CANCEL ]

FIG. 13

SELECT SCHEDULE      OK   CANCEL

◉ DISPLAY FROM EARLIEST PRINT COMPLETION TIME
○ DISPLAY FROM LEAST NUMBER OF PRINTERS
○ DISPLAY FROM MOST FREQUENTLY
  USED PRINTER                    SORT

◉ SELECT
   PRINT START TIME 8:00
   PRINT COMPLETION TIME 11:00

| | 8 | 9 | 10 | 11 | 12 | 13 |
|---|---|---|---|---|---|---|
| PRINTER A | | | | | | |
| PRINTER B | | | | | | |
| PRINTER C | | | | | | |
| PRINTER D | | | | | | |

○ SELECT
   PRINT START TIME 8:00
   PRINT COMPLETION TIME 12:30

| | 8 | 9 | 10 | 11 | 12 | 13 |
|---|---|---|---|---|---|---|
| PRINTER A | | | | | | |
| PRINTER B | | | | | | |
| PRINTER C | | | | | | |
| PRINTER D | | | | | | |

○ SELECT
   PRINT START TIME 9:00
   PRINT COMPLETION TIME 13:00

| | 8 | 9 | 10 | 11 | 12 | 13 |
|---|---|---|---|---|---|---|
| PRINTER A | | | | | | |
| PRINTER B | | | | | | |
| PRINTER C | | | | | | |
| PRINTER D | | | | | | |

※ PRINTER TYPE : PRINTER A=PRINTER D, PRINTER B=PRINTER C
※ PRINTING SPEED : PRINTER A=2×PRINTER B

▨ : RESERVED,    ▧ : SCHEDULE CANDIDATE

FIG. 14

SELECT SCHEDULE [OK] [CANCEL]

- ⦿ DISPLAY FROM EARLIEST PRINT COMPLETION TIME
- ○ DISPLAY FROM LEAST NUMBER OF PRINTERS
- ○ DISPLAY FROM MOST FREQUENTLY USED PRINTER

[SORT]

⦿ SELECT
   PRINT START TIME 8:00
   PRINT COMPLETION TIME 9:15

| | 8 | 9 | 10 | 11 | 12 | 13 |
|---|---|---|---|---|---|---|
| PRINTER A | | | | | | |
| PRINTER B | | | | | | |
| PRINTER C | | | | | | |
| PRINTER D | | | | | | |

○ SELECT
   PRINT START TIME 8:00
   PRINT COMPLETION TIME 9:30

| | 8 | 9 | 10 | 11 | 12 | 13 |
|---|---|---|---|---|---|---|
| PRINTER A | | | | | | |
| PRINTER B | | | | | | |
| PRINTER C | | | | | | |
| PRINTER D | | | | | | |

○ SELECT
   PRINT START TIME 8:00
   PRINT COMPLETION TIME 9:30

| | 8 | 9 | 10 | 11 | 12 | 13 |
|---|---|---|---|---|---|---|
| PRINTER A | | | | | | |
| PRINTER B | | | | | | |
| PRINTER C | | | | | | |
| PRINTER D | | | | | | |

※PRINTER TYPE : PRINTER A=PRINTER D, PRINTER B=PRINTER C
※PRINTING SPEED : PRINTER A=2×PRINTER B

▨ : RESERVED,   ▩ : SCHEDULE CANDIDATE

FIG. 15

| DOCUMENT NAME | STATUS | TIME OF ACCEPTANCE |
|---|---|---|
| NEW PRODUCT RELEASE MATERIAL | OUTPUTTING | 10:11:12 02/03/04 |
| CATALOGUE | WAIT FOR OUTPUT | 15:35:52 02/03/04 |
| PRINTER MANUAL | WAIT FOR OUTPUT | 16:45:22 02/03/04 |
| SPECIFICATION | STOPPED | 08:00:05 02/03/03 |

1501

1502

[CONTINUE (N)] [STOP PRINTING (T)]

[HELP (H)] [CLOSE (C)]

FIG. 16

| PRINTER NAME | STATUS | ADDRESS | ADMINISTRATOR | INSTALLATION POSITION |
|---|---|---|---|---|
| HIGH-SPEED PRINTER | IN PRINTING | 191.191.191.1 | ICHIRO SATO | AISLE SIDE (NORTH) |
| COLOR PRINTER | STAND-BY | 191.191.191.2 | HANAKO YAMADA | AISLE SIDE (NORTH) |
| MIDDLE-SPEED PRINTER 1 | STAND-BY | 191.191.191.3 | ICHIRO SATO | AISLE SIDE (SOUTH) |
| MIDDLE-SPEED PRINTER 2 | STAND-BY | 191.191.191.4 | ICHIRO SATO | AISLE SIDE (SOUTH) |
| MIDDLE-SPEED PRINTER 3 | STAND-BY | 191.191.191.5 | ICHIRO SATO | WINDOW SIDE (WEST) |
| MIDDLE-SPEED PRINTER 5 | STAND-BY | 191.191.191.6 | ICHIRO SATO | WINDOW SIDE (WEST) |
| .. | .. | .. | .. | .. |

FIG. 17

| | PAPER FEEDING UNIT | PAPER INFORMATION | (REMAINING AMOUNT) |
|---|---|---|---|
| | MANUAL FEED TRAY | SIZE UNKNOWN | |
| | DECK 1 | LETTER | |
| | DECK 2 | A4 | |
| | CASSETTE 3 | A3 | |
| | CASSETTE 4 | A4 | |
| | SIDE DECK | A4 | |

DEVICE (D)  DISPLAY (V)  SETTING (S)  TEST (T)  HELP (H)

OPERATION STATUS : ☐ PRINTER (P)  ☐ SCANNER (C)

PRINTING POSSIBLE

HELP (?)

FIG. 18

| | ITEM | MEANING (SET VALUE) |
|---|---|---|
| ORDER INFORMATION | SERVICE TYPE | OUTPUT / BOOKBINDING SERVICE |
| | | POSTER / PANEL |
| | | COPY SERVICE |
| | | RE-ORDER |
| | | STORED DOCUMENT |
| | ORDER NAME | ARBITRARY CHARACTER STRING |
| | ORDER ID | 32BYTE UNIQUE CHARACTER STRING |
| | DOCUMENT RECEPTION | NETWORK DOCUMENT RECEPTION |
| | | MEDIA DOCUMENT RECEPTION |
| | FINISHING | 1 FILE → 1 DOCUMENT |
| | | PLURAL FILES → 1 DOCUMENT |
| | | PLURAL FILES → PLURAL DOCUMENTS |
| | DUE TIME | DATE AND TIME OF DELIVERY |
| FILE INFORMATION | NUMBER OF UPLOAD FILES | NUMBER OF DOCUMENT-RECEPTION FILES |
| | UPLOAD FILE NAME | ARBITRARY CHARACTER STRING |
| | FILE ID | 32BYTE UNIQUE CHARACTER STRING |
| | PAGE NUMBER | DESIGNATED NUMERIC VALUE |
| | OS TYPE | Windows / Machintosh / Unix |
| | DOCUMENT GENERATION APPLICATION | Microsoft Word |
| | | Microsoft Excel |
| | | : |
| | | OTHER |
| | APPLICATION VERSION | ARBITRARY CHARACTER STRING |
| PRINT FORMAT | FINISHED SIZE | B0, A0, B1, A1 |
| | DIRECTION OF OUTPUT SHEET | PORTRAIT |
| | | LANDSCAPE |
| | BOOKBINDING TYPE | WRAPPING BINDING |
| | | SADDLE STITCH |
| | | RING BOOKBINDING |
| | | STAPLE |
| | | OTHER (COMMENT) |
| | BINDING DIRECTION | LEFT (WIDTH UNDESIGNABLE) |
| | | RIGHT (WIDTH UNDESIGNABLE) |
| | | UPPER (WIDTH UNDESIGNABLE) |
| | | OTHER (COMMENT) |
| | PRINTING (TEXT) | SINGLE SIDED |
| | | DOUBLE SIDED |
| | COLOR MODE (TEXT) | MONOCHROME |
| | | COLOR |
| | PAPER TYPE (TEXT) | BLACK AND WHITE NORMAL PAPER |
| | | COLOR NORMAL PAPER |
| | | BOLD PAPER (THICKNESS DESIGNABLE) |
| | | GLOSSY PAPER |
| | | COLOR PAPER (COLOR DESIGNABLE) |
| | | MONOCHROME OHP FILM |
| | | COLOR OHP FILM |
| | PUNCH HOLE | 2 HOLES, 3 HOLES, 4 HOLES, 6 HOLES, 30 HOLES |
| | FOLDING | 2-FOLD, 3-FOLD, X-FOLD |
| | COVER | COVER ATTACHED |
| | | COVER UNATTACHED |
| | PRINTING (FRONT COVER) | NOT PRINTED |
| | | SINGLE SIDED |
| | | DOUBLE SIDED |
| | PRINTING (BACK COVER) | NOT PRINTED |
| | | SINGLE SIDED |
| | | DOUBLE SIDED |
| | COLOR MODE (FRONT / BACK COVER) | MONOCHROME |
| | | COLOR |

F I G. 19

| ID | PRINTER TYPE | UNOCCUPIED TIME START TIME | UNOCCUPIED TIME END TIME | PROCESSIBLE DATA AMOUNT PER 1 HOUR | PROCESSIBLE DATA AMOUNT |
|---|---|---|---|---|---|
| 10000001 | PRINTER A | 8:00 | 8:00 | 60Mbyte | 60Mbyte |
| 10000002 | PRINTER A | 10:00 | 11:00 | 60Mbyte | 60Mbyte |
| 10000003 | PRINTER B | 8:00 | 10:00 | 30Mbyte | 60Mbyte |
| 10000004 | PRINTER B | 11:00 | 13:30 | 30Mbyte | 75Mbyte |
| 10000005 | PRINTER C | 8:30 | 9:00 | 30Mbyte | 15Mbyte |
| 10000006 | PRINTER C | 10:00 | 11:00 | 30Mbyte | 30Mbyte |
| 10000007 | PRINTER C | 12:00 | 13:00 | 30Mbyte | 30Mbyte |
| 10000008 | PRINTER D | 9:00 | 10:30 | 60Mbyte | 90Mbyte |
| 10000009 | PRINTER D | 12:00 | 14:00 | 60Mbyte | 120Mbyte |

FIG. 22

| ID | PRINTER TYPE | UNOCCUPIED TIME START TIME | UNOCCUPIED TIME COMPLETION TIME | NUMBER OF PROCESSIBLE SHEETS PER UNIT TIME (ppm) | PROCESSIBLE AMOUNT (NUMBER OF SHEETS) |
|---|---|---|---|---|---|
| 101 | PRINTER A | 8:00 | 9:00 | 10 | 600 |
| 102 | PRINTER A | 8:30 | 9:00 | 10 | 300 |
| 103 | PRINTER B | 8:00 | 8:30 | 5 | 150 |

F I G. 23

| REFERENCE ID | | | DETERMINATION RESULT | COMPLETION TIME | |
|---|---|---|---|---|---|
| 101 | | | × | | |
| 101 | 102 | | ○ | 8:55 | 2303 |
| 101 | 103 | | × | | 2304 |
| 101 | 102 | 103 | ○ | 8:50 | 2306 |
| 102 | | | × | | |
| 102 | 103 | | × | | |
| 103 | | | × | | |

FIG. 24

INPUT SCHEDULE CONDITIONS    DELIVERY DUE TIME : 200X/XX/XX 16:00

2401
- ◉ START TIME   [ 08 ] : [ 00 ]
- ◉ COMPLETION TIME   [ 14 ] : [ 00 ]
- ○ SCHEDULE IN 1 PRINTER
- ○ SCHEDULE IN PLURAL PRINTERS
  - ○ SCHEDULE IN PRINTERS OF SAME TYPE
  - ○ SCHEDULE IN COLOR AND MONOCHROME PRINTERS

2402
INPUT PRIORITY
[ 1 ▼ ]   [ OK ]

SELECT SCHEDULE DISPLAY ORDER
- ○ DISPLAY FROM EARLIEST PRINT COMPLETION TIME
- ○ DISPLAY FROM LEAST NUMBER OF PRINTERS
- ○ DISPLAY FROM MOST FREQUENTLY USED PRINTER

[ OK ]   [ CANCEL ]

FIG. 25

| EXTRACTION CONDITION | PRIORITY |
|---|---|
| START TIME | 2 |
| COMPLETION TIME | 1 |
| SCHEDULE IN 1 PRINTER | 3 |

FIG. 27

| DETERMINATION SUBJECT n | REFERENCE ID | | | START TIME | COMPLETION TIME | DETERMINATION RESULT 1 | DETERMINATION RESULT 2 | DETERMINATION RESULT 3 |
|---|---|---|---|---|---|---|---|---|
| n=1 | 101 | | | 8:00 | 12:20 | × | ○ | ○ |
| n=2 | 101 | 102 | | 8:00 | 8:55 | ○ | ○ | × |
| n=3 | 101 | 103 | | 8:00 | 12:05 | × | ○ | × |
| n=4 | 101 | 102 | 103 | 8:00 | 8:50 | ○ | ○ | × |
| n=5 | 102 | | | 8:30 | UNDECIDED | × | × | ○ |
| n=6 | 102 | 103 | | 8:00 | UNDECIDED | × | ○ | × |
| n=7 | 103 | | | 8:00 | UNDECIDED | × | ○ | ○ |

FIG. 28

NO CANDIDATE TIME SATISFIED EXTRACTION CONDITIONS

CANDIDATE TIMES SATISFIED PART OF EXTRACTION CONDITIONS ARE:

[OK] [CANCEL]

[SORT]

◉ SELECT   PRINT START TIME 8:00
           PRINT COMPLETION TIME 8:50

|        | 8 | 9 | 10 | 11 | 12 | 13 |
|---|---|---|---|---|---|---|
| PRINTER 101 | ▨ | ▨ | ▨ | ▨ |   |   |
| PRINTER 102 | ▨ | ▨ | ▨ | ▨ | ▨ | ▨ |
| PRINTER 103 | ▨ | ▨ | ▨ | ▨ | ▨ | ▨ |

— 2801

○ SELECT   PRINT START TIME 8:00
           PRINT COMPLETION TIME 8:55

|        | 8 | 9 | 10 | 11 | 12 | 13 |
|---|---|---|---|---|---|---|
| PRINTER 101 | ▨ | ▨ | ▨ | ▨ |   |   |
| PRINTER 102 | ▨ | ▨ | ▨ | ▨ | ▨ | ▨ |
| PRINTER 103 |   | ▨ | ▨ | ▨ | ▨ | ▨ |

— 2802

○ SELECT   PRINT START TIME 8:00
           PRINT COMPLETION TIME 12:20

|        | 8 | 9 | 10 | 11 | 12 | 13 |
|---|---|---|---|---|---|---|
| PRINTER 101 | ▨ | ▨ | ▨ | ▨ | ▨ |   |
| PRINTER 102 |   | ▨ | ▨ | ▨ | ▨ | ▨ |
| PRINTER 103 | ▨ | ▨ | ▨ | ▨ | ▨ | ▨ |

— 2803

INFORMATION PROCESSING APPARATUS AND ITS CONTROL METHOD

FIELD OF THE INVENTION

The present invention relates to an information processing apparatus and its control method, preferably applicable to a print system having a print-job scheduling function.

BACKGROUND OF THE INVENTION

Conventionally, a commercial print service to carry out generation of printed matter by request from clients including companies and individuals, is known. In commercial print services, a printing company receives print data as an original copy, designation of print format, the number of copies, delivery date and the like. The service then generates printed matter according to the designations, and delivers the generated printed matter to the client.

In commercial print services, it is necessary for the printing company to complete printing with continuing high quality by the designated delivery date. Especially, in a printing company having a large scale printing center, an operator handles a great number of print orders in parallel using various printing apparatuses and operation computers.

Accordingly, in commercial print services, it is important to generate a printer-use schedule to fully utilize resources, such as various apparatuses, as much as possible. However, it is a heavy burden on the operator to determine the inactive statuses and the abilities of the respective printing apparatuses by manual operation and also to generate a use schedule of printing apparatuses corresponding to the conditions of each order.

Japanese Patent Application Laid-Open No. Hei 10-240459 proposes a system for generating an efficient printer-use schedule without high burden on an operator. According to the system, regarding each print job, the earliest completion of printing is scheduled by predicting time required for print processing, and the like and estimating the final print completion time. Herein, the terms "completion time" and "ending time" are used synonymous and interchangeably.

However, in the conventional system above, the printing is merely scheduled so that each job can be completed at the earliest possible time. Accordingly, even if there is much time, the operator performs printing in accordance with a determined schedule, and a schedule candidate projecting the operator's intention cannot be presented. That is, the schedule is not always the most desirable for the operator. On the other hand, for the operator, various schedules may be desirable within the range of delivery due dates in accordance with various circumstances such as a printing environment. For example, as long as delivery can be made by a due date, the operator may perform printing at a printing apparatus most closest to the operator (or a printing apparatus most frequently used by the operator). Otherwise, the operator may perform printing using a single printing apparatus rather than plural printing apparatuses.

As described above, the operator's most desirable schedule cannot be definitively determined. Accordingly, a scheduling system to satisfy the minimum requirement that "printing is completed by the delivery due date" and flexibly meet the operator's requirements without a heavy burden on the operator is desired. However, there is no conventional art to satisfy such requirements.

SUMMARY OF THE INVENTION

The present invention has been made in consideration of the above situation, and has as its object to enable an operator to easily select a desired schedule by generating and presenting various operation schedule candidates based on unoccupied time of printing apparatuses.

Accordingly, to attain the foregoing object, the present invention provides an information processing apparatus which manages operation schedules of printing devices, comprising: a schedule storage unit configured to store operation schedules of printing devices; a detection unit configured to detect unoccupied times of the printing devices as candidate times, based on the operation schedules; a retrieval unit configured to estimate possible processing amounts in the respective candidate times detected by the detection unit, and retrieving candidate times or combinations of candidate times having the estimated possible processing amounts greater than a processing amount of document data to be print-outputted; a selection unit configured to present the candidate times or combinations of candidate times retrieved by the retrieval unit, and select desired times from candidate times or combinations of candidate times; and a determination unit configured to determine an operation schedule of printing device for the document data to be print-outputted, based on the candidate units or combinations of candidate units selected by the selection unit.

Other features and advantages of the present invention will be apparent from the following description taken in conjunction with the accompanying drawings, in which like reference characters designate the same name or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 5 is a sequence diagram of a processing sequence in the print system according to the embodiment;

FIG. 6 illustrates the module construction of a print management server according to the embodiment;

FIG. 7 is an example of an operation screen of a workflow editor according to the embodiment;

FIG. 10 is an example of an operation screen upon checking of schedule information using a device scheduler according to the embodiment;

FIG. 12 is an example of an operation screen upon designation of schedule conditions by an operator using the device scheduler according to the embodiment;

FIG. 13 is an example of an operation screen showing schedule candidates for print processing by a printer, given by the device scheduler according to the embodiment;

FIG. 14 is an example of the operation screen showing schedule candidates for print processing by plural printers, given by the device scheduler according to the embodiment;

FIG. 15 is an example of an operation screen of a job manager according to the embodiment;

FIG. 16 is an example of an operation screen of a device manager according to the embodiment;

FIG. 17 is another example of the operation screen of the device manager according to the embodiment;

FIG. 18 is an example of order information file according to the embodiment;

FIG. 19 is an example of unoccupied time information generated by the device scheduler according to the embodiment;

FIG. 22 is a table showing the storage format of unoccupied times and processing abilities of printers;

FIG. 23 is a table showing an example of determination results as to whether or not ordered document data can be processed;

FIG. 24 is an example of an operation screen where priority can be set upon setting of extraction conditions;

FIG. 25 is a table showing association between extraction conditions and priority;

FIG. 27 is a table showing an example of predicted processing results calculated based on extracted processing abilities and unoccupied times of the respective printers;

FIG. 28 is an example of a display screen where secondary candidate times are displayed from a candidate time which satisfies many of extraction conditions with higher priority.

DETAILED DESCRIPTION OF THE PREFERRED EMBODIMENTS

Preferred embodiments of the present invention will now be described in detail in accordance with the accompanying drawings. Note that constituent elements in the following embodiments are merely shown by way of example and the scope of the invention is not limited by these elements.

<Print System>

Figure 1:
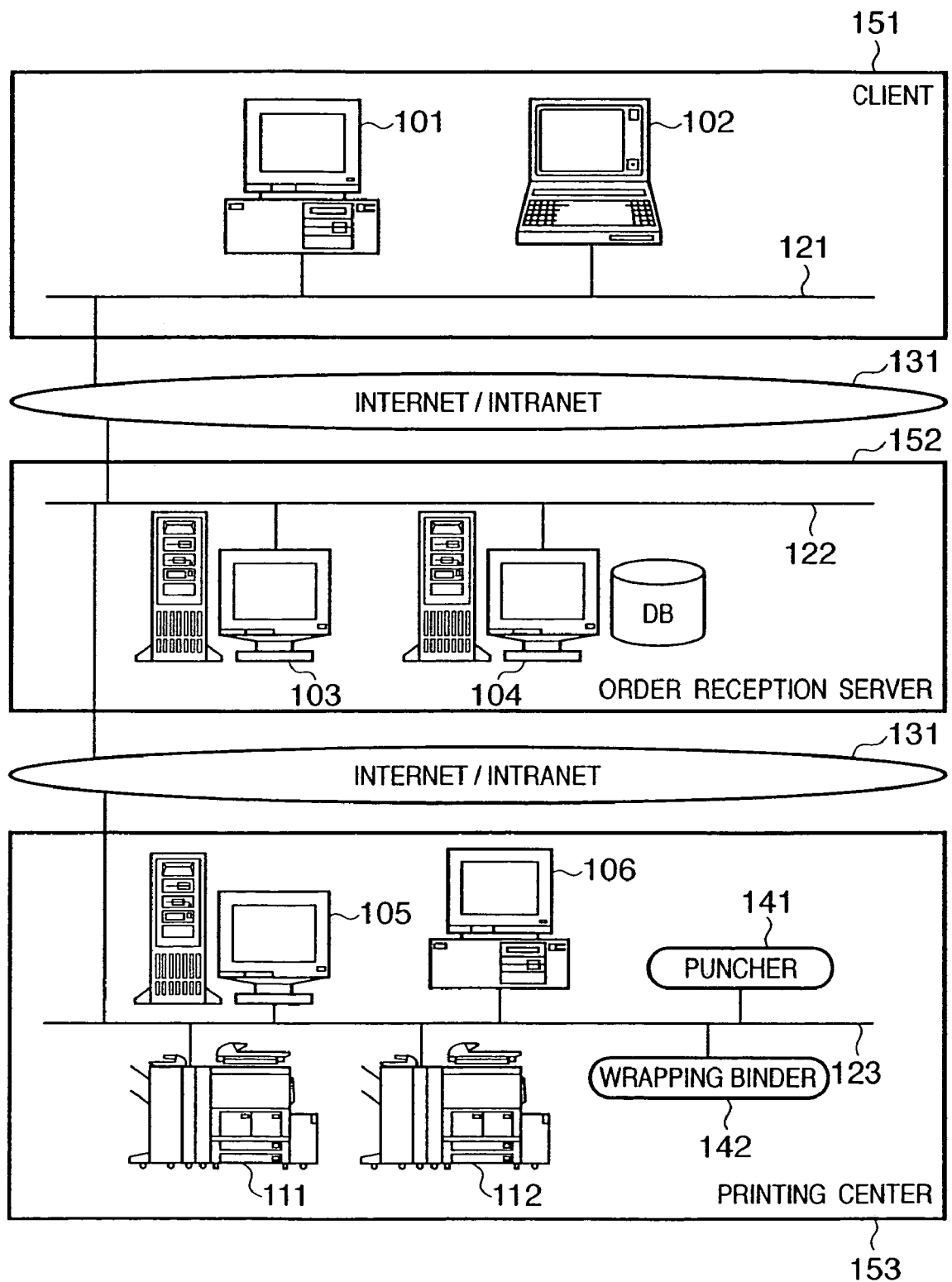
FIG. 1 illustrates the system configuration of a print system according to an embodiment of the present invention.

FIG. 1 illustrates the system configuration of a print system according to an embodiment of the present invention. The print system includes a client 151, an order reception server 152, and a printing center 153. The client 151 includes information processing apparatuses which respectively function as a client operated by a user and issue a print request. The order reception server 152 receives a print request and document data file by communication with the client 151, and transmits print designation information to the print center 153 based on the contents of the received data. The print center 153 performs print scheduling and executes print processing based on the contents of the print designation information received from the order reception server 152.

In the present embodiment, the client 151 and the order reception server 152, and the order reception server 152 and the printing center 153 are respectively interconnected by Internet/Intranet or the like (hereinbelow, simply referred to as a "network") 131, and are capable of mutual communication. Generally, the client 151 and the order reception server 152 are interconnected by the Internet, and the order reception server 152 and the printing center 153 are interconnected by the Intranet using a dedicated line. However, the present embodiment is not limited to such environment. For example, the present invention is applicable to an environment where the order reception server 152 exists in the printing center 153.

The client 151 is an information processing apparatus such as a desk top PC (hereinbelow, "PC") 101 or a notebook PC 102 used in a house or office (hereinbelow, referred to as "client units 101 and 102"), and is used by a general user to make a print request. The client units 101 and 102 are connected to the network 131 such as the Internet or Intranet via a LAN 121 as access means including a network cable such as an Ethernet (registered trademark) cable. Accordingly, the client units 101 and 102 perform mutual communication with the order reception server 152 via the network 131. Note that the access means to the network 131 is not limited to the Ethernet (registered trademark) cable, but a communication cable compliant with RS232C interface or a radio communication means such as a radio LAN may be employed. Similar access means is used for access to other networks in the following description.

A program used upon uploading of print request and document data file to the order reception server 142 by the user is installed in the client units 101 and 102. In the present embodiment, a so-called Internet browser is employed.

The order reception server 152 has a WEB server 103 and a DB server 104. A document reception program to receive a print request and document data file by communication with the client 151 operates on the WEB server 103. Further, the DB server 104 holds information of the print request and document data file received by the WEB server 103. The WEB server 103 and the DB server 104 may co-exist in a single information processing apparatus, however, in the present embodiment, exist in two information processing apparatuses as a matter of convenience. The WEB server 103 and the DB server 104 are interconnected by a network such as a LAN 122 and capable of mutual communication.

The document reception program which operates on the WEB server 103 has edit control and file designation control. The edit control enables input of print settings such as print format such as bookbinding, the number of copies and the paper size, and the contents of print request such as delivery due date, orderer information and delivery destination. The file designation control uploads a document data file. Note that logics such as a logic to calculate a printing fee in correspondence with an input print request and a logic to perform finalizing of input matters are realized by service modules which operate on the WEB server 103. The WEB server 103 receives a print request and a document data file by communication with the client 151, and stores the document data file into the DB server 104. Further, the WEB server 103 generates an order file where the contents of user's request, a file name and a path name are described, and stores the order file, with the document data file, into the DB server 104.

A predetermined database software program is installed in the DB server 104, such that desired order file and document data file can be transmitted in correspondence with a data acquisition request from a print management server 105 to be described later. A DB schemer (not shown) mainly has a printing center master table, a device master table and a bookbinding device master table. The printing center master table has information on the position, contact address and the like of the printing center, the device master table and the bookbinding device master table as members. The device master table has device information such as color/monochrome, the number of print copies and options as members.

The bookbinding device master table has information on a puncher, a wrapping binder and the like as members. The print management server 105 in the printing center 153 receives an order allocated to the center by referring to these tables.

The printing center 153 has the print management server 105, an operation PC 106, printing apparatuses and the like. The print management server 105 periodically collects order files and document data files stored in the DB server 104. Further, a print management program to be described later operates on the print management server 105. The operation PC 106 is used by the operator for operating the print management program on the print management server 105. Further, the printing apparatuses include printers such as a monochrome printer 111 and a color printer 112, bookbinding devices 141 and 142 used in off line bookbinding. The print management server 105, the operation PC 106, the printers 111 and 112 and the bookbinding devices 141 and 142 are interconnected by a network such as a LAN 123 and capable of mutual communication.

The print management server 105 is an information processing apparatus which receives a notification of finalization of order from the WEB server 103, collects an order file and a document data file from the DB server 104, and operates the print management program to be described later in accordance with the contents of the order file. The print management program has an order manager, a workflow manager, a job manager, a device manager and device scheduler. In the present embodiment, as a matter of convenience, the print management program operates on a single information processing apparatus, however, the present invention is not limited to this arrangement. For example, the invention includes a case where plural information processing apparatuses are used for parallel operation of the program.

The operation PC 106 is an information processing apparatus which controls various services provided by the print management program on the print management server 105 in accordance with the operator's operation, and which performs designated print setting and issues various instructions to the printing devices such as the printers 111 and 112 and bookbinding devices 141 and 142. The operation PC 106 provides an operation screen which the operator can easily operate, GUI (Graphical User Interface).

The installation arrangement of the monochrome printer 111 and the color printer 112 is different in respective printing centers. In the present embodiment, they are a high-speed monochrome printer and a high-quality color printer. As the printers 111 and 112 are connected with the LAN 123, information on the printing apparatuses can be provided from the information processing apparatuses such as the print management server 105 and the operation PC 106 connected with the LAN 123. The operations of these printers are scheduled by the device scheduler of the print management program operating on the print management server 105.

The bookbinding devices 141 and 142, which are off line bookbinding devices to bookbind paper outputted from the printers 111 and 112, include a stapler, a puncher, a wrapping binder, a ring bookbinding device and the like. As the bookbinding devices 141 and 142 are connected with the LAN 123, information on the printing apparatuses can be provided from the information processing apparatuses such as the print management server 105 and the operation PC 106 connected with the LAN 123. Further, as in the case of the printers, the installation arrangement of the bookbinding devices is different in the respective printing centers.

Note that the arrangement of the printing center 153 is not limited to the above arrangement. For example, the system can be constructed with arbitrary numbers of the print management servers 105, the operation PCs 106, the printers and the bookbinding devices, and with an arbitrary network structure.

Further, in the present specification, the print system has one client 151, one order reception server 152 and one printing center 153, however, the present invention is not limited to this arrangement. The invention includes a case where plural clients, plural order reception servers and plural printing centers exist. For example, the invention includes a case where plural printing centers exist, and the order reception server selects a printing center to issue a print instruction based on information on printers of the respective printing centers or the like.

Further, in the present specification, as a matter of convenience, the print system has the client 151, the order reception server 152 and the printing center 153 corresponding to the respective roles, however, the present invention is not limited to this arrangement. For example, the invention includes a case where a part or entire function of the order reception server 152 is implemented in the client 151 or the printing center 153, or a case where a part or entire function of the printing center 153 is implemented in the client 151 or the order reception server 152.

<Information Processing Apparatus>

Figure 2:
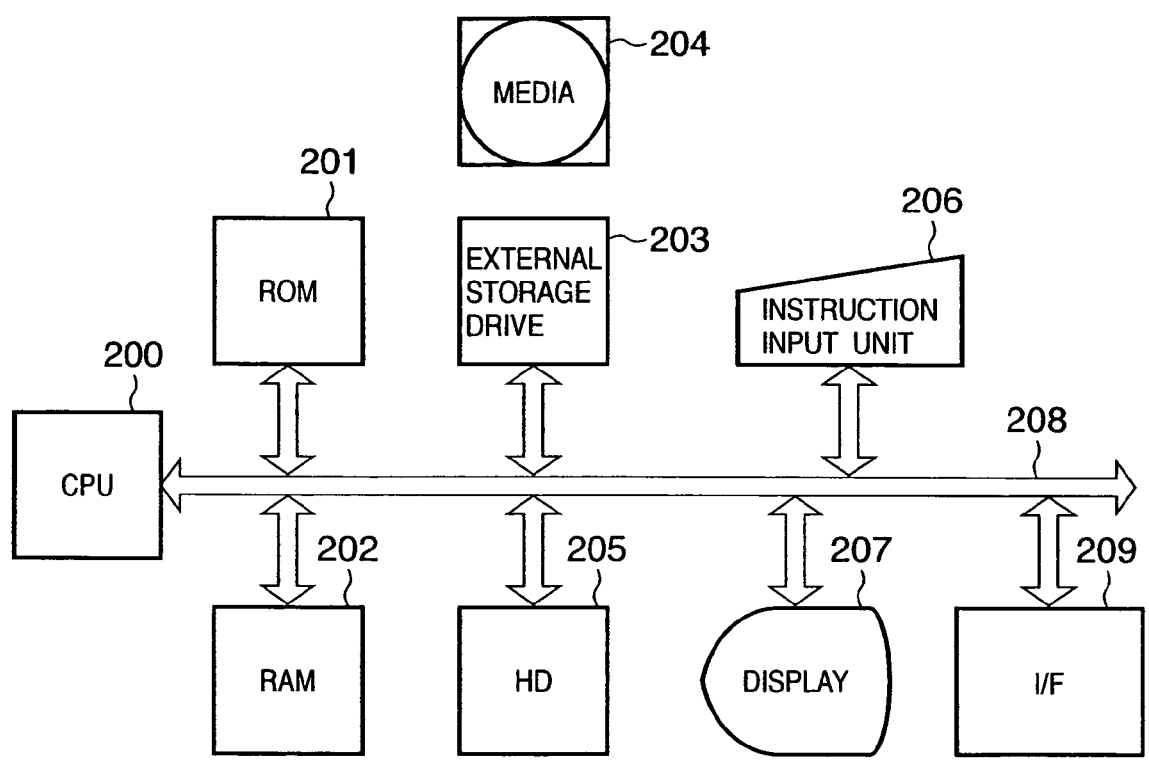
FIG. 2 is a block diagram showing the construction of an information processing apparatus according to the embodiment.

Next, the outline of the information processing apparatus as a constituent of the print system of the embodiment will be described. FIG. 2 is a block diagram showing the construction of the information processing apparatus as a constituent of the print system. The above-described client units 101 and 102, the WEB server 103, the DB server 104, the print management server 105 and the operation PC 106 have similar or identical hardware structure.

In FIG. 2, reference numeral 200 denotes a CPU which executes an application program, a printer driver program, an operating system (OS), a printer control program and the like stored in a hard disk (HD) device 205 to be described later. Further, the CPU 200 temporarily stores information and file(s) necessary for program execution in a RAM 202.

Numeral 201 denotes a ROM in which programs including a basic I/O program, various data such as font data used upon document processing, template data and the like are stored. Numeral 202 denotes a RAM for temporary storage of various data. The RAM 202 functions as a main memory, a work area or the like for the CPU 200.

Figure 4:
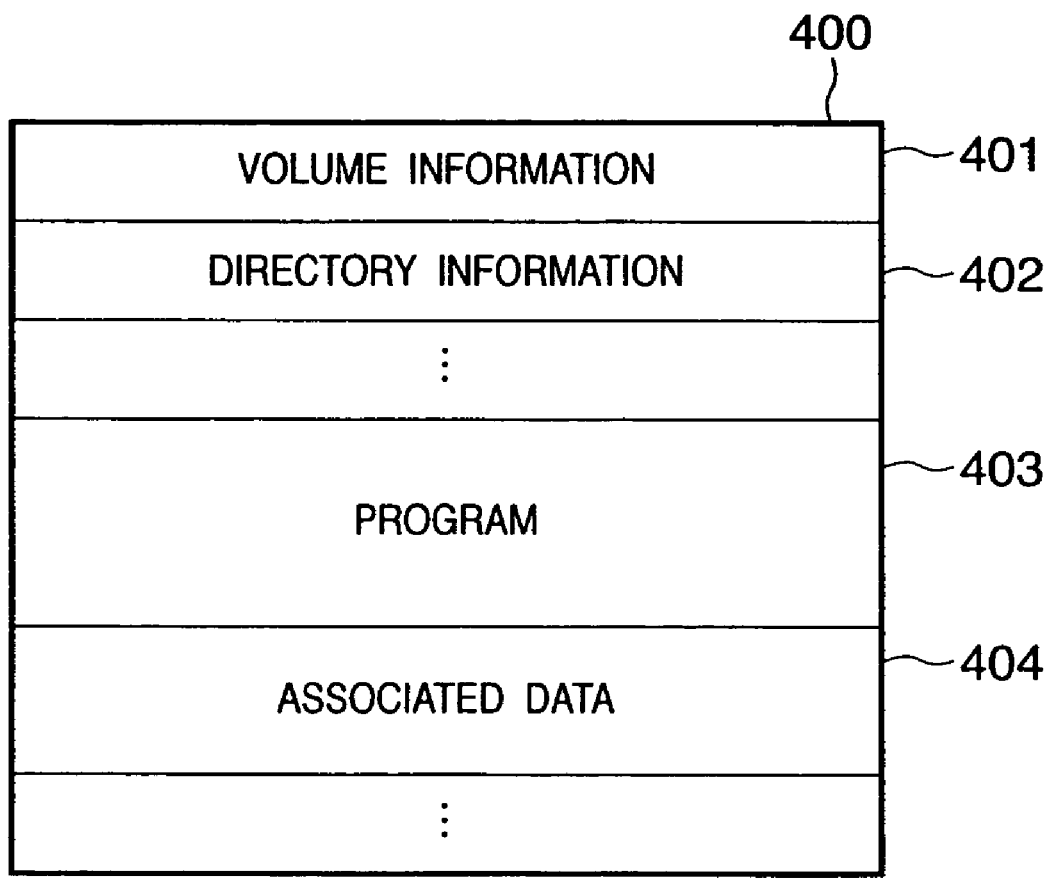
FIG. 4 illustrates a memory map showing data inside a medium according to the embodiment.

Numeral 203 denotes an external storage drive for access to a recording medium. A program or the like stored in a medium (recording medium) 204 can be loaded to the present computer system. Note that medium 204 is an arbitrary medium such as a flexible disk (FD), a CD-ROM, a CD-R, a CD-RW, a PC card, a DVD, an IC memory card, an MO, or a memory stick. FIG. 4 shows the structure of the contents stored in the medium 204.

Numeral 205 denotes an external storage device. In the present embodiment, an HD which functions as a large capacity memory is employed as the external storage device 205. The HD 205 holds an application program, a printer driver program, an OS, a printer control program, associated program and the like.

Numeral 206 denotes an instruction input unit such as a keyboard, a pointing device (mouse or the like) and a touch panel. Device control commands or the like are inputted from the instruction input unit by the user to the client units 101 and 102 or by the operator or manager to the servers 103 to 105 or the operation PC 106.

Numeral 207 denotes a display on which a command inputted from the instruction input unit 206, a printer status or the like is displayed.

Numeral 208 denotes a system bus for data flow in the information processing apparatus. Numeral 209 denotes an interface (I/F) via which data transmission with an external device is performed. In the present embodiment, the I/F 209 realizes connection with a local area network (LAN) and the Internet.

Note that it may be arranged such that the functions of the hardware devices are realized by software to realize the same functions as those of the hardware devices.

Figure 3:
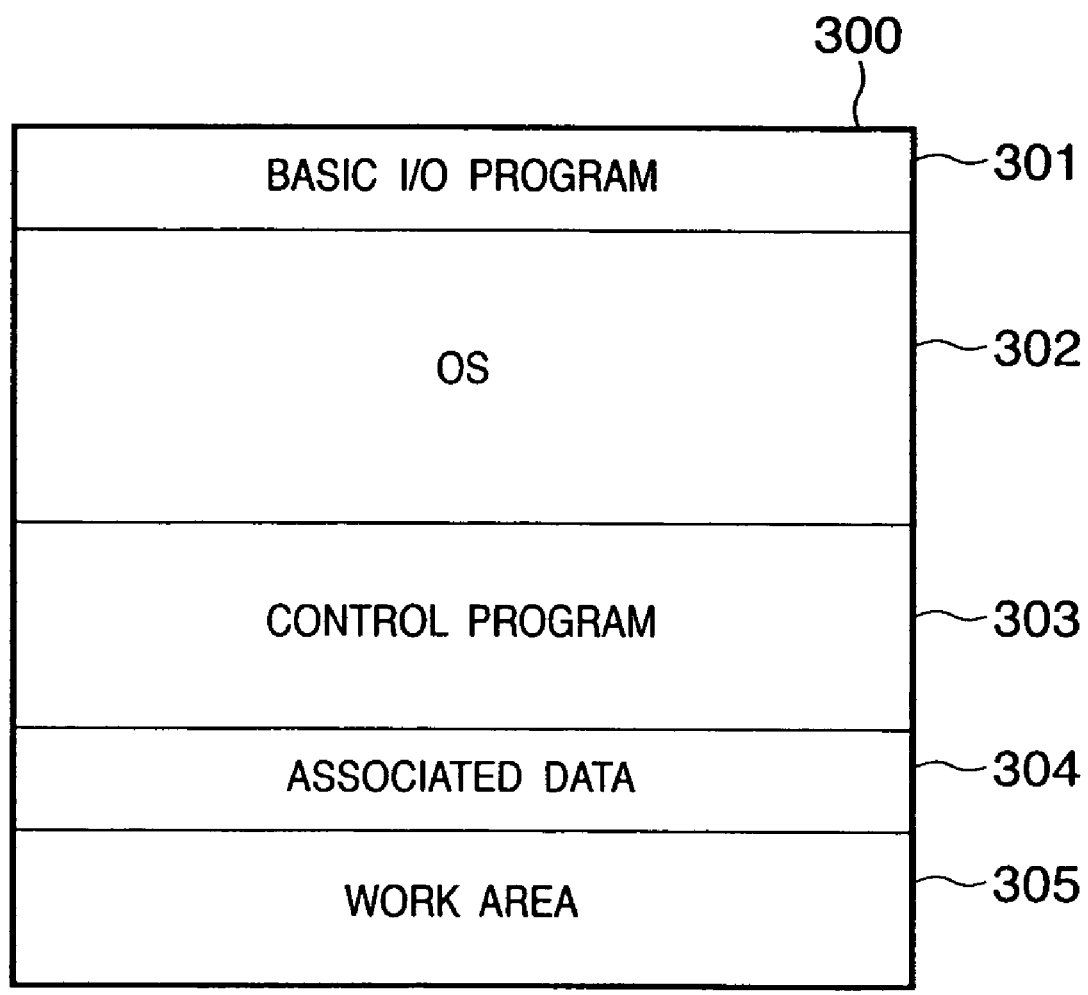
FIG. 3 illustrates a memory map where a program is expanded on a RAM according to the embodiment.

FIG. 3 shows a memory map in a status where a program of the present embodiment is loaded to the RAM 202 and is executable.

In the present embodiment, a program related to the present embodiment and associated data are directly loaded from the medium 204 to the RAM 202 and executed, however, the present invention is not limited to this arrangement. For example, it may be arranged such that every time the program related to the present embodiment is operated, the program is loaded from the HD 205 where the program has been already installed, to the RAM 202.

Further, the medium holding the program related to the present embodiment may be an FD, a CD-ROM, a DVD, an IC memory card or the like. Further, it may be arranged such that the program related to the present embodiment is stored in the ROM 201 as a part of the memory map, and directly executed by the CPU 200.

In FIG. 3, an area 301 holds a basic I/O program having an IPL (initial program loading) function of, when the power of the apparatus is turned on then the OS is read from the HD 205 to the RAM 202, starting the operation of the OS. An area 302 holds the OS. An area 303 holds a control program. An area 304 holds associated data. An area 305 is a work area for execution of the program by the CPU 200.

In FIG. 4, an area 400 holds data contents of the medium 204. An area 401 holds volume information indicating information on the data. An area 402 holds directory information. An area 403 holds the program to be described in the present embodiment. An area 400 holds the associated data. The program in the area 403 is program code based on the flowchart of FIG. 11.

<Flow of Information>

FIG. 5 is a sequence diagram showing the flow of information in the present embodiment. First, the user performs communication with the WEB server 103 using the client 151, then makes a print request (order) and uploads a document data file. When the contents of order inputted from the client 151 have been finalized, an order file is generated by the WEB server 103, and stored in the DB server 104. When the document data file has been uploaded, the document data file is stored in the DB server 104.

When the storage processing has been completed, the WEB server 103 transmits a notification of print order reception to the print management server 105 in the printing center 153. In response to the notification, the print management server 105 obtains the order file from the DB server 104. When the document data file has been uploaded, the print management server 105 also obtains the document data file from the DB server 104. When the acquisition has been completed, the print management server 105 notifies the WEB server 103 of the completion of acquisition of order reception notification. The order file and the document data file obtained from the DB server 104 are stored in a storage unit such as the HD 205 in the print management server 105.

By the series of processings, the print-associated data in the order reception server 152 and the printing center 153 are synchronized. The order reception server 152 performs order reception processing, and the printing center 153 performs print processing. Thus the load on the entire system can be distributed between two locations.

<Print Management Program>

Next, processing in the printing center 153 after the acquisition of the order file and the document data file by the print management server 105 from the DB server 104 will be described. First, the outline of the print management program operating on the print management server 105 will be described. FIG. 6 illustrates function modules of the print management program.

As shown in FIG. 6, the print management program mainly has components, an order manager 601, a workflow manager 602, a job manager 603, a device scheduler 604, and a device manager 605. The order manager 601 manages input print requests. The workflow manager 602 manages the flow of print processing (workflow) related to each of the print requests. The job manager 603 manages print jobs. The device scheduler 604 manages printer operation reservations (operation schedules or schedules). The device manager 605 manages the printers and bookbinding devices to perform various print processings. Hereinbelow, these main components basically operate on the print management server 105, and an operation program to operate the components via the network (including a GUI) is installed in the operation PC 106. In the following description, an operator in the printing center 153 operates the print management program using the operation program.

Note that the program is not limited to this arrangement. For example, it may be arranged such tat the print management program and the operation program operate on a single computer, otherwise, it may be arranged such that the respective components of the print management program are distributed among plural computers. Further, it may be arranged such that the operation program operates on plural computers and plural operators simultaneously perform print management works.

The print management server 105 obtains an order file and a document data file from the DB server 104 based on reception of order reception notification from the WEB server 103. Then, the order manager 601 generates an order information file describing order information (setting information) from these files. Then the order manager notifies the operator of the order reception via the operation PC 106.

The operator checks the order reception, then generates workflow information describing print processing process using the workflow editor 607. The workflow information is managed by the workflow manager 602. The workflow information is arbitrarily updated by the operator's input or communication with the job manager 603, the device scheduler 604, the device manager 605 and the like.

In the workflow, when the process of "device reservation" has been executed, the operator generates a printer print schedule using the device scheduler 604. the device scheduler 604 manages information of the printers 111 and 112 such as operation schedules. The device scheduler 604 generates print schedule options satisfying various conditions of the order using device information (printer abilities and the like) managed by the device manager 605 and already-reserved schedule, and presents the print schedule options to the operator. The operator selects a desired one of the print schedule options presented by the device scheduler 604, and reserves the schedule.

After the schedule reservation, when print start time described in the schedule has come, print processing is performed based on the printing conditions.

Hereinbelow, the respective components of the print management program to realize the above-described processings will be described in detail. Note that the components as program actually performs various computations and information input/output under the control of the CPU 200 of the information processing apparatus. However, in the following description, as a matter of convenience, the components performs various computations and information input/output by themselves.

Further, in a case where the services provided by the print management program which operates on the print management server 105 is provided to the operator via the operation PC 106, the services are actually provided as follows. That is, a program which produces an operation screen on the operation PC 106 (operation program) is executed under the control of the CPU 200 of the operation PC 106, and communication with the print management server 105 is performed based on the contents of the operation program. Then, the print management server 105 and the operation PC 106 perform predetermined operations based on the contents of the print management program and the operation program, thereby the above services are realized. However, in the following description, as a matter of convenience, the components of the print management program performs predetermined control on the operation PC 106.

Note that the present embodiment is not limited to implementation by a computer program, but covers an information processing apparatus and its control method, a computer-readable storage medium holding the computer program, an information processing system and the like.

(Order Manager)

The order manager as one of the components of the print management program will be described. FIG. 7 is an example of an operation screen in a status where the order manager 601 on the print management server 105 has been started and is operated from the operation PC 106.

The order manager 601 extracts print information from an order file collected from the WEB server 103 and the DB server 104, combining the information with a path name of document data file, thus generates an order information file necessary for printing, and temporarily stores in, e.g., an area of the HD 205. Further, the document data file is also stored. As the contents of the order information file are, as shown in FIG. 18, order generation information (including service type, order name, order ID, document reception style, finish style, delivery due time and the like), file information (upload file number, upload file name, file ID, page number, OS type, document generation application, application version and the like), print format information (finished size, output paper direction, bookbinding type, binding direction, printing (text), color mode (text), paper type (text), punch holes, folding, cover, printing (cover), printing (rear cover), color mode (front/rear cover) and the like), and the like.

The operation screen of the order manager 601 shown in FIG. 7 has a list display screen 701 to display order outline based on the order information, and a tab display screen 702 to display order detail information. The operator can check the progress of the order by watching the operation screen. Further, the same order is uploaded to the WEB server 103 at the timing of update of the order progress, and further, similar information in HTML is provided on a progress content screen (not shown) provided on the WEB server 103. In this arrangement, the user can check the progress of the order. The order information is held until the printing has been completed and the printed matter has been delivered, and then deleted for security protection.

FIG. 7 is an example of display screen on the display 207 of the operation PC 106 in a case where the operation screen of the order manager 601 is implemented as a native application operating on the OS. However, it may be arranged such that an application to produce such display screen is implemented as an HTML-base WEB application. In the following description, as a matter of convenience, the operation program operating on the operation PC 106 is implemented as a native application.

In the list display screen 701 in an upper part of the operation screen shown in FIG. 7, the outline including an ID for identification of the order and a person responsible and process status and the like are displayed. When one order has been selected in the list display screen 701, the details of order information are displayed in the tab display screen in a lower part of the operation screen. The displayed contents include the contents of print settings in FIG. 18.

It may be arranged such that the order manager 601 communicates with the other components of the print management program, to provide the order information or correct the order information based on information received from the other components. The other components of the print management program include the workflow manager 602, the job manager 603, the device scheduler 604 and the device manager 605.

As described above, the operator operates the order manager 601, thereby easily checks the progress of the order. Further, in a case where the order manager communicates with the other components, the order information can be accessible.

(Workflow Manager)

Next, the workflow manager 602 as one of the components of the print management program and the workflow editor 607 used by the operator to edit the workflow will be described.

Figure 8:
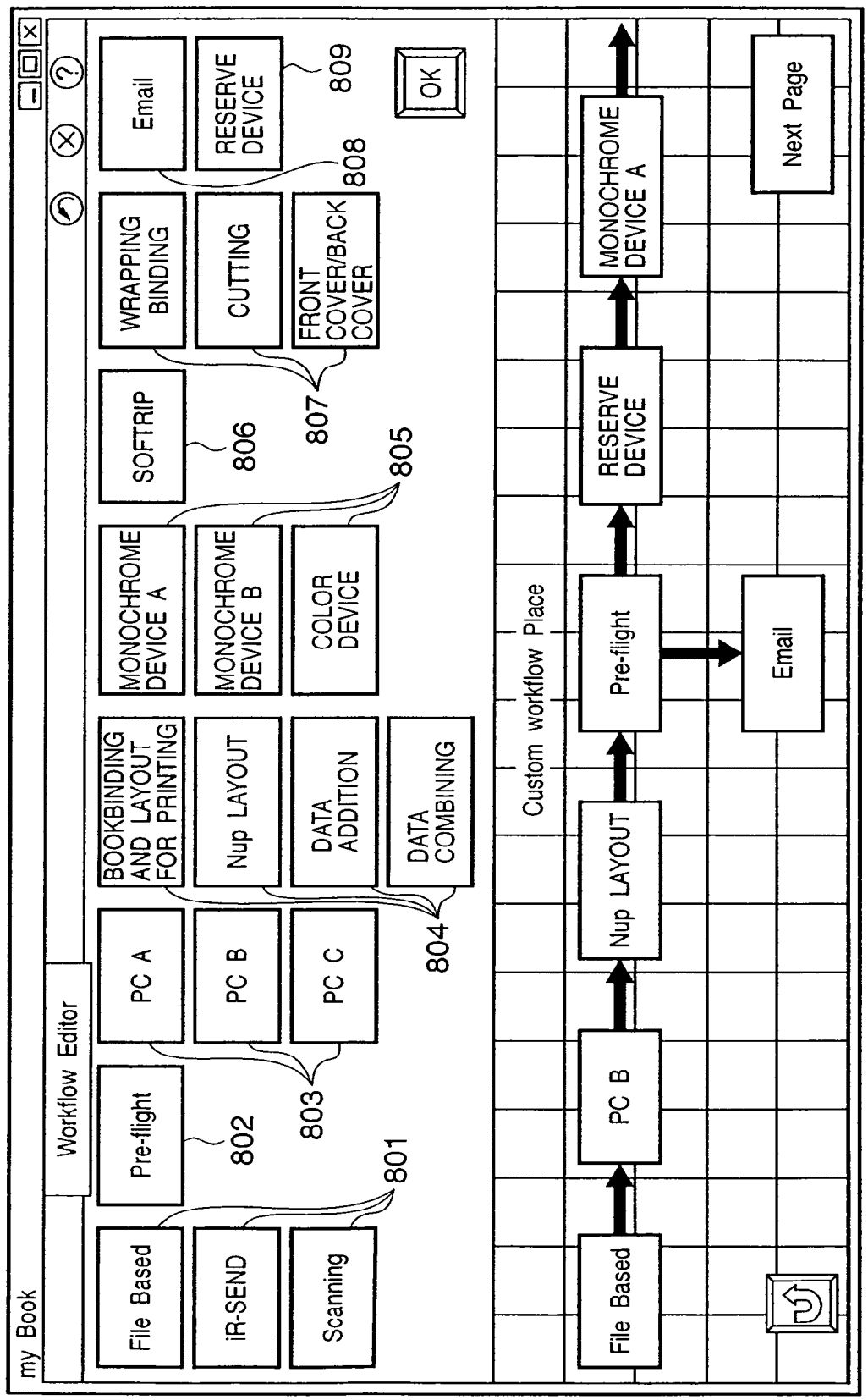
FIG. 8 is an example of an operation screen of a workflow manager according to the embodiment.

FIG. 8 is an example of an operation screen of the workflow editor 607. The workflow editor 607 enables the operator to generate workflow by order with simple operation in accordance with the order information managed by the order manager 601. The "workflow" is information showing the flow of print processing for the order, and is used by the operator to check the progress of the print processing based on the order. The workflow is processed as workflow information by the workflow manager 602 which manages printing workflows.

In an upper part of the operation screen of the workflow editor 607 (FIG. 8), icons (blocks) indicating the process in the print processing, device and the like are arranged. Further, the display is controlled such that the icons are selectively displayed in correspondence with the printing environment of the printing center. Further, it may be arranged such that the order manager 601 is accessed upon editing of the workflow and the icons are changed in correspondence with the contents of order information. The workflow editor 607 provides an interface to realize the order by the operator's selecting and combining these icons using the instruction input unit 206. For example, it may be arranged such that a workflow is generated by drag & drop of icons indicating processes, using a pointing device (mouse or the like) at the instruction input unit 206.

In FIG. 8, numeral 801 denotes an icon indicating a process at which image data as the subject of print processing is inputted into the print management server 105. Numeral 802 denotes an icon indicating a process at which it is determined whether or not print processing ordered in the workflow is executable by the printer 111, 112, 141 or the like provided in the printing center 153.

Numeral 803 denotes an icon for, when plural operation PCs are provided in the printing center 153, selecting an operation PC used by the operator. Numeral 804 denotes an icon related to a process for setting of bookbinding; 805, an icon related to a process of print processing in a printer; and 807, an icon related to a process of processing by the bookbinding device. Further, numeral 808 denotes a process of E-mail transmission; and 809, a process of setting related to device reservation (scheduling) of printer and the like.

As this arrangement is provided by the workflow editor 607, the operator can generate a workflow with simple operations. Note that the interface of the workflow editor 607 as above is merely an example, and the present embodiment of the invention is not limited to this arrangement.

Figure 9:
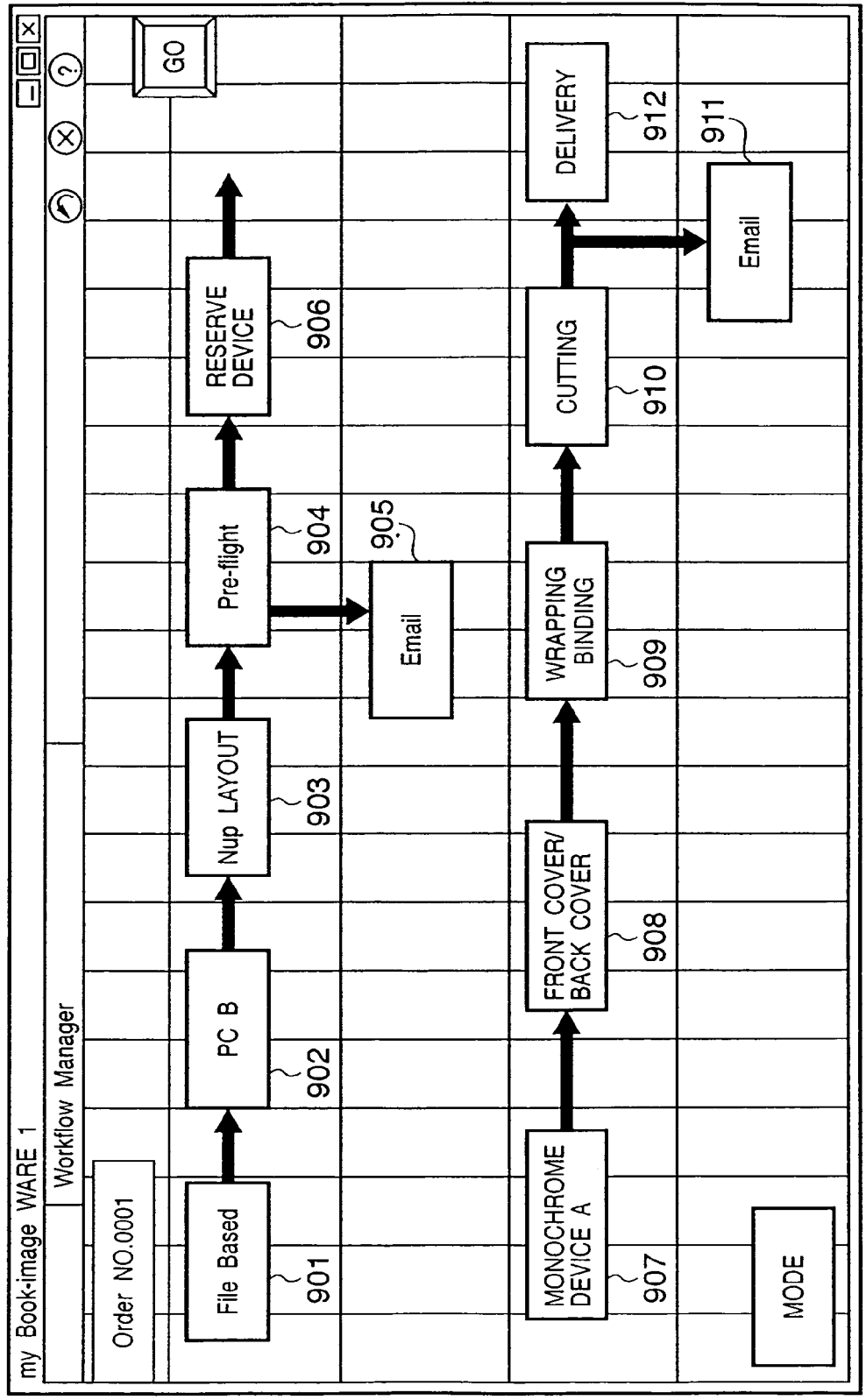

The workflow manager 602 reads a workflow generated by the operator using the workflow editor 607, and manages the progress based on the workflow. The workflow manager 602 produces a visible display of the progress of the workflow. FIG. 9 is an example of operation screen of the workflow manager 602 on the operation PC 106.

The respective processes of the print processing are indicated with icons, as any one of "unprocessed", "in process", and "processed". In an initial status, all the icons are set to the "unprocessed" status. The status held by the icon is displayed such that the status can be easily recognizable, by using icon color, mark or the like.

Numeral 901 denotes a process at which image data as the subject of print processing is inputted into the print management server 105 in the form of file; 902, a process at which "PC B" is selected as an operation PC; 903, a process at which N-up layout is selected; 904, a process at which it is determined whether or not the ordered print processing is executable by the printer 111, 112, 114 or the like provided in the printing center 153; and 905, a process at which, if it is determined that print processing satisfying the order conditions cannot be executed in the printing center 153, an E-mail is transmitted to the client 151. If it is determined that print processing is executable by the printer 111, 112, 141 or the like provided in the printing center 153, device reservation is performed at a device reservation process 906. The device scheduler 604 to be described later is used at the device reservation process 906.

Numerals 907, 908, 909, 910, 911 and 912 denote respective processes after the device reservation. At process 907, "monochrome device A" is selected as a printer. At process 908, front cover and rear cover are generated. At process 909, bookbinding is performed with a wrapping binder. At process 910, cutting after the bookbinding process is performed. In the workflow of FIG. 9, when the cutting process has been completed, an E-mail is transmitted (icon 911) to a client, and the cut printed matter is delivered to the client as shown at a delivery process 912.

Note that in the operation screen of the workflow manager 602, the icons displayed on the screen are not always edited on the workflow editor 607. For example, it may be arranged such that icons are automatically generated based on notifications from the other components of the print management program. For example, it may be arranged such that, at the device reservation process 906, (1) the device scheduler 604 to be described later generates a schedule, (2) the device scheduler 604 notifies the contents of the schedule to the workflow manager 602 based on the schedule, (3) the workflow manager 602 appropriately arranges the icons of the processes 907 to 912 based on the contents of the notification.

When a notification of start of operation from the operator or the component of the print management program has been received, the workflow manager 602 performs control such that an icon indicating a first-executed process is set to an in-process status. The operator performs predetermined operations in the respective processes based on visibly-displayed progress of the workflow. Otherwise, when the status of icon indicating the process has changed from an unprocessed status to the in-process status, information indicating a processing request is automatically transmitted to the other components of the print management program (the order manager 601, the job manager 603, the device scheduler 604, the device manager 605 and the like), so as to execute the processes of the workflow by the other components. At each process, when the processing has been completed, the process status is changed to a completed status, and then the next process is set to the in-process status in accordance with notification from another component of the print management program or the operator's operation.

Further, the workflow manager 602 returns status-related information in accordance with a status acquisition request from the order manager 601. Then the order manager 601 holds and utilizes the status of the order.

As described above, the workflow manager 602 easily-recognizably displays the progress of the workflow, and the status is updated by the components of the print management program or the operator's operation. Accordingly, the operator can easily check the print processing status of each order. Further, as information indicating a processing request is automatically transmitted to other components to execute the progresses of the workflow, a part of the operator's work can be automated.

(Device Scheduler)

As described above, in the workflow managed by the workflow manager 602, when the "device reservation" process has been executed, the operator generates a print schedule of the printer using the device scheduler 604. At this time, it may be arranged such that when the workflow manager 602 detects that the "device reservation" process has been executed, the workflow manager 602 notifies that the completion of the "device reservation" process to the operation PC 106, so as to produce a predetermined display on the display 207 of the operation PC 106. In this arrangement, the operator can easily check that the "device reservation" process has been executed. Otherwise, it may be arranged such that the workflow manager 602 detects that the "device reservation" process has been executed and notifies the completion of the "device reservation" process to the device scheduler 604, to automatically start the device scheduler 604. In this arrangement, the operator can easily work using the device scheduler 604.

Next, the device scheduler 604 as one of the components of the print management program will be described. The device scheduler 604 is a component to facilitate reservation of printer by the operator. The device scheduler 604 holds information related to operation schedules of the respective printers as schedule information in its storage device such as the HD 205.

Figure 10:
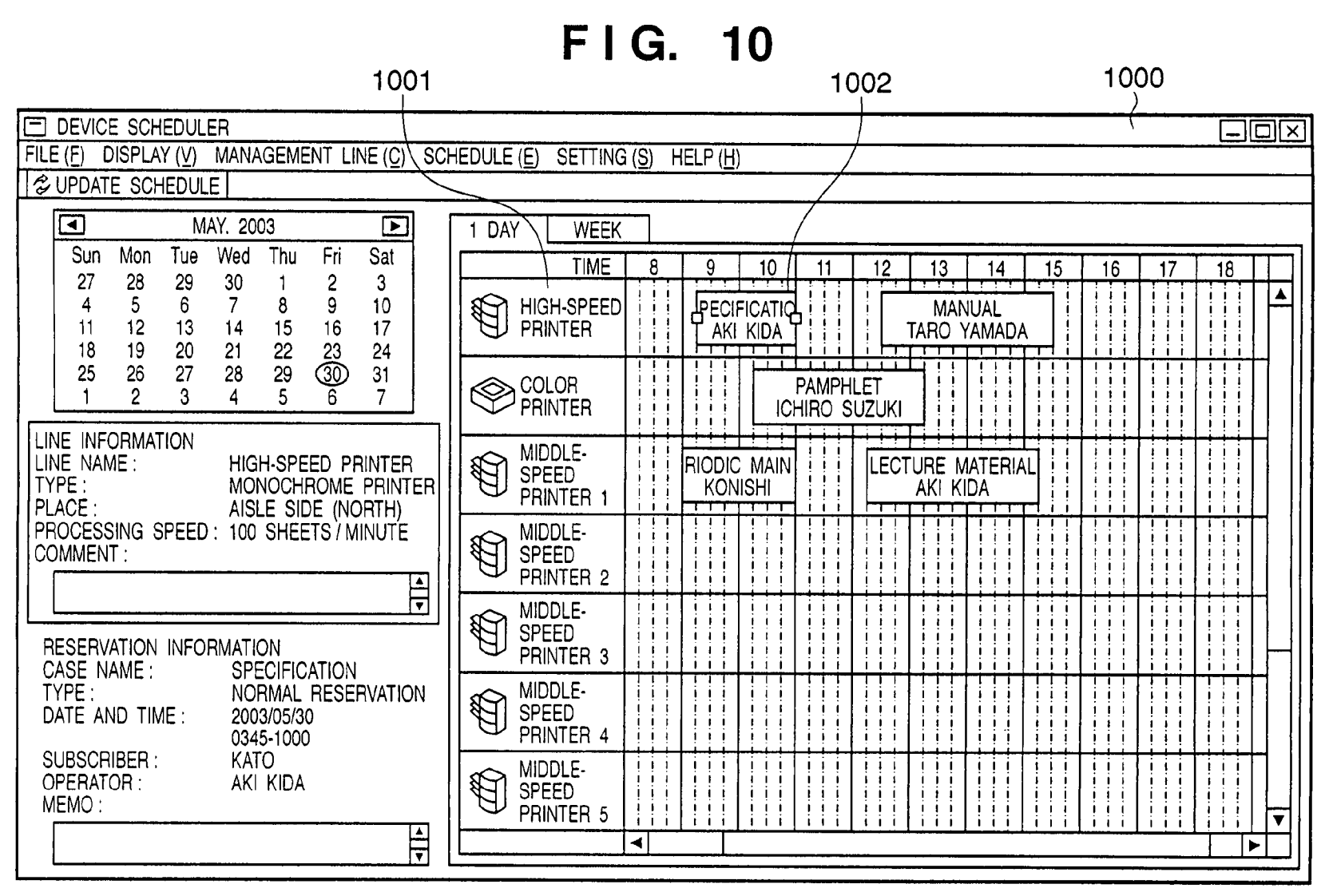

The device scheduler 604 provides a service to notify a printer schedule (schedule information) by access from the operation PC 106 by the operator. The operator obtains the information related to the operation schedules of the printers in the printing center 153. The schedule information indicates printer type, print job type, print start time, print completion time and the like. FIG. 10 is an example of operation screen showing the schedules of the printers generated by the device scheduler 604. The reserved/unreserved statuses of the printers are respectively displayed by week.

Figure 11:
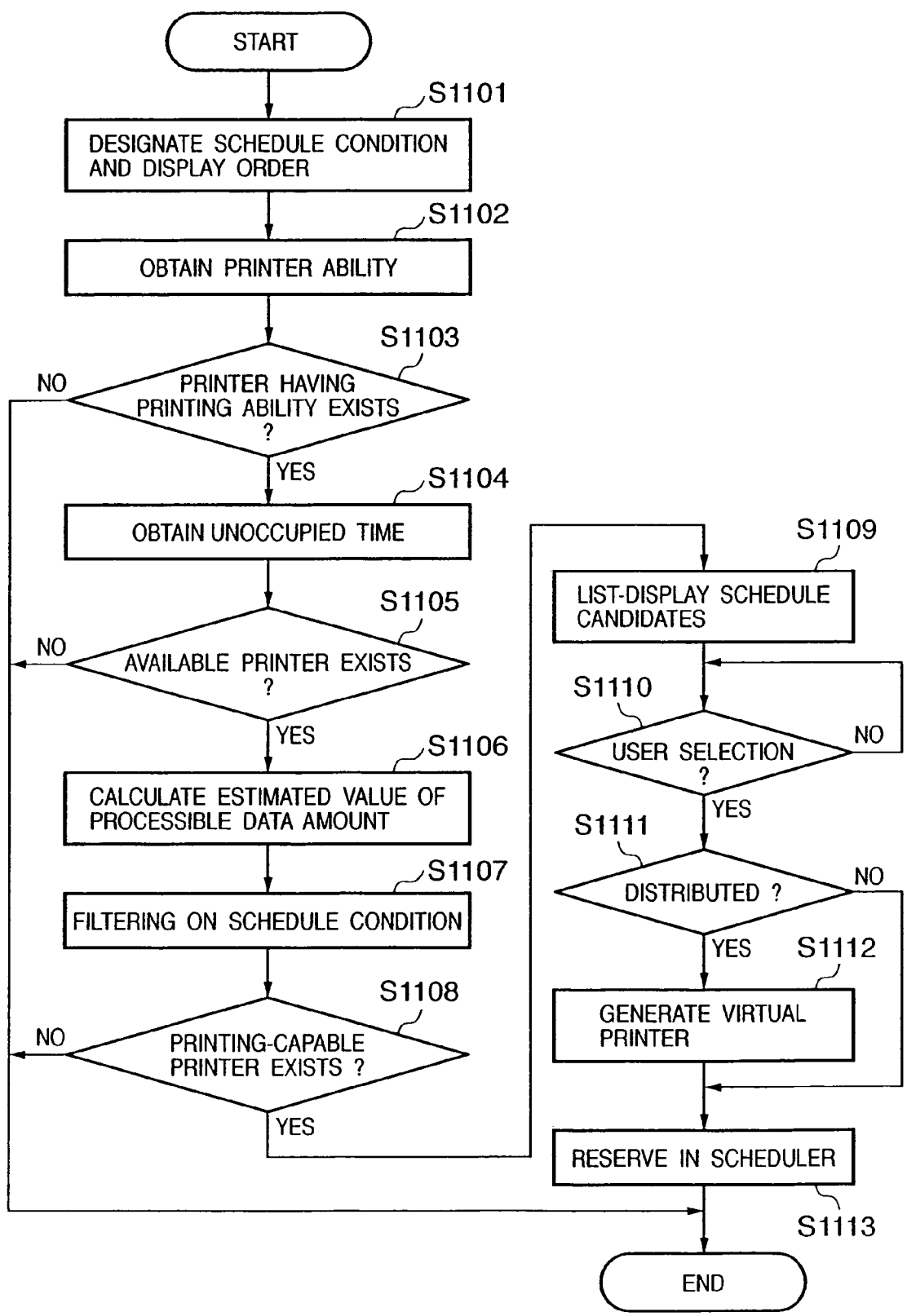
FIG. 11 is a flowchart showing processing for schedule reservation by the device scheduler according to the embodiment.

Next, the flow of processing by the device scheduler 604 upon printer reservation by the operator's operation will be described with reference to FIGS. 11 to 14. FIG. 11 is a flowchart showing the processing by the device scheduler 604 when the operator selects a schedule corresponding to order conditions and makes a printer reservation.

Prior to the start of the flowchart, the device scheduler 604 obtains an ID or order, of which a schedule is to be generated, based on the operator's order selection. The device scheduler 604 accesses the order manager 601 to obtain detailed information of the order (including e.g. the information shown in FIG. 18), and temporarily stores the obtained information as order information in a storage device such as the RAM 202.

Then at step S1101, the device scheduler 604 displays an operation screen as shown in FIG. 12 such that the operator inputs respective schedule-related conditions (schedule conditions). The schedule conditions include the following items.
1. print start time and/or print completion time
2. scheduling in a single printer or in plural printers
3. in the case of plural printers, scheduling in printers of the same type or plural types (color, monochrome and the like)

Further, the operator's input items may include designation of display order of schedules satisfying the conditions (from earliest print completion time, from the least number of printers, from the most frequently used printer). Note that conditions regarding display order are handled as display conditions. When the operator makes selection regarding these input items and depresses an OK button, the device scheduler 604 temporarily stores the information inputted by the operator as schedule condition information in a storage device such as the RAM 202, and the process proceeds to step S1102. Note that as the schedule conditions are also conditions for extracting candidate times, the schedule conditions may also be described as extraction conditions.

At step S1102, the device scheduler 604 accesses the device manager 605, to obtain the information on the abilities of the printers 111 and 112 satisfying the conditions designated by the operator at step S1101. Then the device scheduler temporarily stores the obtained information as device information in a storage device such as the RAM 202. Note that the information on printer abilities include processing speed per unit time, finishing functions such as bookbinding/stapling/punching and the like. As described later, the device manager 605 holds and manages information on the devices including printers, bookbinding devices and the like provided in the printing center 153.

Next, at step S1103, the device scheduler 604 compares the device information of the respective printers, obtained at step S1102, with the previously-obtained order information. Then it is determined whether or not there is printer(s) which can perform printing in accordance with the printing conditions other than the delivery due time described in the order information (finished size, output paper direction, bookbinding type, binding direction and the like). If such printer(s) exists (YES at step S1103), the process proceeds to step S1104, while if such printer(s) does not exist (NO at step S1103), the operator is notified that there is no appropriate printer. Then the process ends without reservation.

At step S1104, reservation unoccupied times of printers, which have been determined at step S1103 that they can perform printing, are obtained from reservation statuses up to the current time point. Then, at step S1105, it is determined whether or not there is printer(s) which has unoccupied time by the print completion time designated at step S1101. If such printer(s) exists (YES at step S1105), the process proceeds to step S1106, while if such printer(s) does not exist (NO at step S1105), the operator is notified that there is no appropriate printer. Then the process ends without reservation.

At step S1106, regarding each of the printers which have been determined at step S1105 that they have unoccupied time, the processible print data amount in its unoccupied time is calculated from the processing speed per unit time. Note that the processing speed per unit time of each printer is obtained from the device information obtained at step S1102. Note that a "processing amount" in the present application is the number of sheets or data amount print-outputtable in each unoccupied time. The calculation of the number of processible sheets is made by "the number of processible sheets per unoccupied time=processing speed per unit time×unoccupied time". Further, the calculation of processible data amount is made by obtaining processible data amount information per unit time in each printer by the device manager. Accordingly, the data amount can be calculated by "processible data amount per unoccupied time=processible data amount per unit time×unoccupied time". Note that the above two calculations are shown as example, and other calculations may be used. Further, examples of processing using the number of output sheets as the processing amount and processing using data amount will be described later.

At the present step, regarding each of continuous unoccupied times distributed between the print start time and the print completion time designated at step S1101, an estimated value of print data amount processible in the unoccupied time is obtained. Then, the start time and end time of the unoccupied time, and the amount of data processible in the unoccupied time, are temporarily stored as unoccupied time information, with the printer type, the serial number (ID) and the like, in a storage device such as the RAM 202. FIG. 19 shows an example of unoccupied time information generated by the processing at step S1106. The unit of candidate (continuous unoccupied time) for generation of schedule recognizable with the serial number is referred to as a "schedule candidate time (candidate time)".

Next, at step S1107, the device scheduler 604 refers to the unoccupied time information generated at step S1106, and retrieves schedule candidate times to process all the ordered document data. Note that the retrieval of schedule candidates to process ordered document data will be described later with reference to FIG. 21. The device scheduler 604 temporarily stores the retrieved schedule candidate times as schedule candidate data in a storage device such as the RAM 202. Note that upon start of scheduling, the amount of the document data and the number of output sheets are obtained from the previously-obtained order information.

Next, an example of processing using a data amount as a processing amount will be described.

In a case where the amount of document data is 120 Mbytes, processing can be performed by retrieving a combination of candidate units having a processing capability equal to or greater than the document data amount. For example, in FIG. 19, the combinations of serial numbers (IDs) (10000001 and 10000003) and (10000003 and 10000004) can be given. Thus the schedule candidates are defined as a combination of serial numbers of schedule candidate units.

Next, regarding each of the retrieved schedule candidate units, only units satisfying conditions based on the schedule condition information generated at step S1101 are extracted (filtering). At this time, in accordance with purpose of the embodiment, units satisfying all the conditions of the schedule condition information may be extracted, or units satisfying a part of the conditions of the schedule condition information may be extracted. Otherwise, all the retrieved candidate units or combinations of candidate units may be extracted (without filtering).

The arrangement to extract schedule candidates or combinations of schedule candidates satisfying a part of the conditions of the schedule condition information is realized by, e.g., implementing the following processing. That is, points are assigned to the respective condition items of the schedule condition information (the number of printers, printer types and the like), and regarding each of the schedule candidates retrieved at step S1107, a parameter "schedule condition conformity" is newly set. Next, regarding each of the schedule candidates, it is determined whether or not the respective condition items are satisfied, and points corresponding to the items, if satisfied, are added to the schedule condition conformity. Then, the schedule candidates are ranked from a candidate with the greatest value of schedule condition conformity. In this processing, the schedule candidates are displayed from a schedule candidate satisfying many of the condition items and having the highest the schedule condition conformity value. (The above display manner may have applicability in a case where the display is performed using priority described later) As described later, at step S1109, the schedule candidates are displayed sequentially from a candidate with the highest schedule condition conformity. By this control, a candidate satisfying many of significant conditions designated by the operator can be presented by priority to the operator. Note that the points assigned to the respective condition items of the schedule condition information may be arbitrarily set by the operator. Further, it may be arranged such that schedule candidate units or combinations of schedule candidate units having schedule condition conformity equal to or greater than a predetermined value are extracted.

The device scheduler 604 temporarily stores the retrieved and extracted schedule candidate units or combinations of schedule candidate units as schedule candidate data in a storage device such as the RAM 202.

At step S1108, it is determined whether or not there is schedule candidate unit(s) or combination(s) of schedule candidate units to print-output all the document data. If it is determined that there is no schedule candidate to print-output all the document data (NO at step S1108), the result of determination is notified to the operator at step S1108. Then the process ends without reservation.

If there is schedule candidate time(s) or combination(s) of schedule candidate times to print-output all the document data (YES at step S1108), the process proceeds to step S1109. As shown in FIG. 13 or 14, at step S1109, the schedule candidates retrieved and extracted at step S1107 are displayed on the operation screen. Note that if the point addition as schedule condition conformity has been performed at step S1107, the schedule candidates are displayed sequentially from a candidate with the greatest value. Accordingly, a candidate satisfying many of significant conditions designated by the operator can be presented by priority to the operator. FIG. 13 shows an example of the operation screen where schedule candidates for scheduling in a single printer are displayed. FIG. 14 shows an example of the operation screen where schedule candidates for scheduling in plural printers are displayed.

Figure 20:
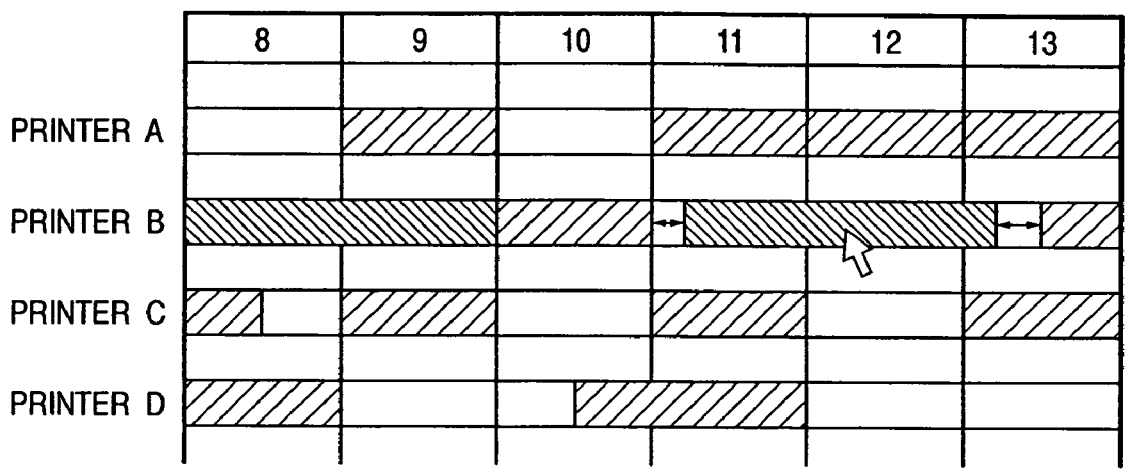
FIG. 20 is an example of an operation screen of the device scheduler where schedule setting is performed using a pointing device or the like, according to the embodiment.

Next, at step S1110, the device scheduler 604 performs control such that schedule candidate(s) selected by the user from the displayed schedule candidates is recognizable (in FIGS. 13 and 14, the operator selects schedule(s) and depresses the "OK" button). Note that in a schedule candidate, if its processible print data amount is greater than the ordered document data amount, the device scheduler 604 performs control such that the operator can freely set print time within the schedule candidate. For example, in a case where the document data amount is 120 Mbytes, when a schedule candidate defined as a combination of unoccupied time serial numbers (IDs) (10000003 and 10000004) is selected, the processible print data amount is 60 MB+75 MB=135 MB. This amount is greater than the document data amount. In this case, the device scheduler 604 performs control such that an interface for schedule setting with a pointing device or the like as shown in FIG. 20 is provided.

Next, at step S1111, the device scheduler 604 determines whether or not the finalized schedule is for distributed printing by plural printers. If it is for distributed printing (YES at step S1111), the process proceeds to step S1112, while if it is not for distributed printing (NO at step S1111), the process proceeds to step S1113.

At step S1112, settings necessary for realizing the distributed printing are performed. For example, a virtual printer to realize the distributed printing by plural printers is set. The virtual printer is a program to receive document data, appropriately divide the print processing and distribute the print processing among printers designated in the schedule. Note that in the present embodiment, the distributed printing by plural printers is realized by using a virtual printer, however, the present invention is not limited to the distributed printing by plural printers using virtual printer.

Next, at step S1113, the device scheduler 604 makes a schedule reservation with the schedule determined by the operator. That is, the schedule selected by the operator is stored as new schedule information in a storage device such as the HD 205.

As described above, the device scheduler 604 retrieves schedule candidates satisfying conditions bet the time limits designated by the operator, and displays the candidates, thereby reduces the load on the operator upon estimation of printing. Further, as the schedule candidates are displayed and selected from a candidate satisfying the operator's requirements by priority, the operator can perform scheduling appropriate to various circumstances such as printing environment with simple operation.

Figure 21:
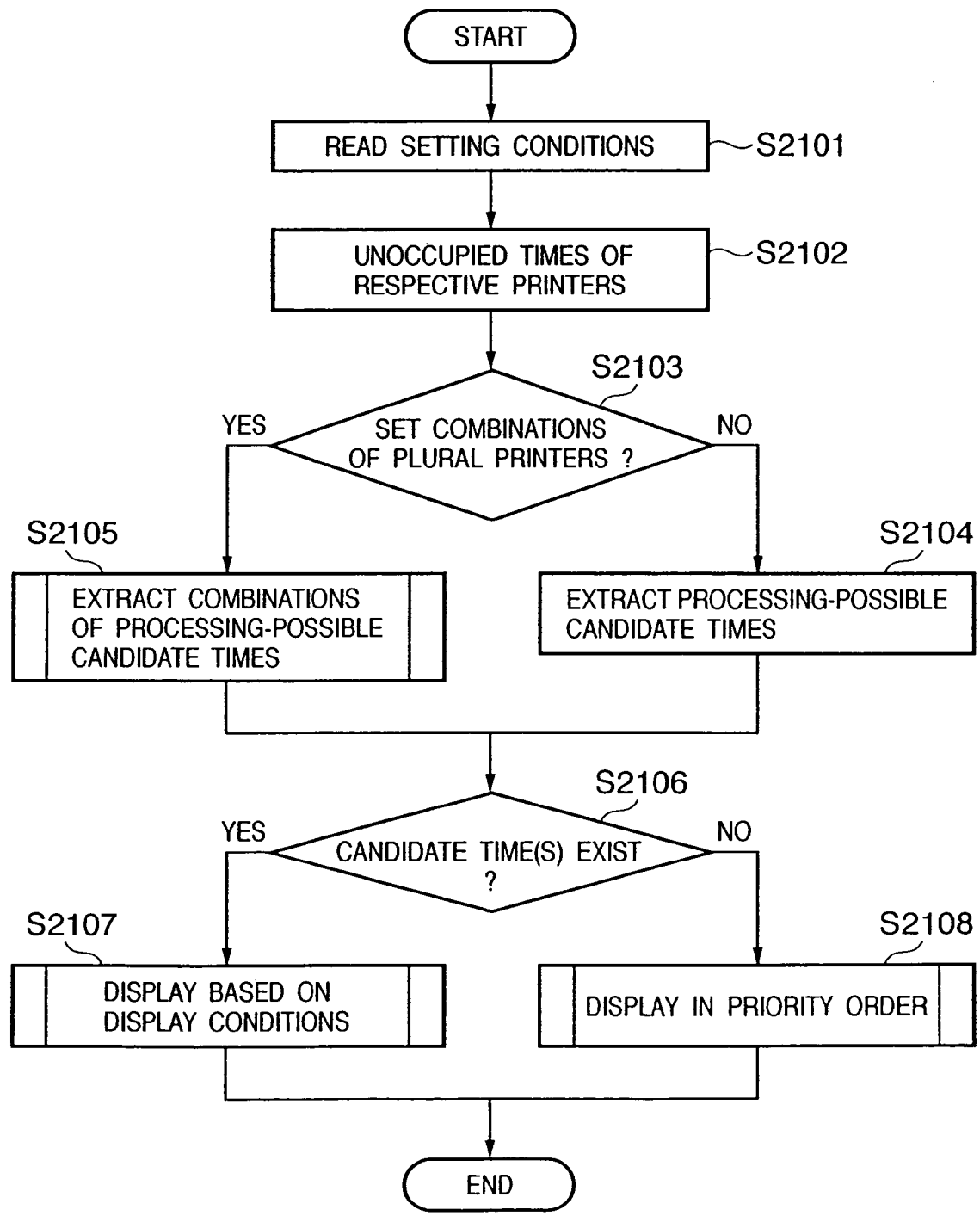
FIG. 21 is a flowchart showing retrieval of schedule candidates for processing ordered document data.

Next, the retrieval of schedule candidate times to process ordered document data at step S1107 will be described with reference to FIGS. 21 and 22.

The device scheduler 604 recognizes the extraction conditions set using the setting screen shown in FIG. 12 (S2101). As the extraction conditions set using the setting screen in FIG. 12 are held in the RAM 202, the device scheduler 604 refers to the RAM 202 to recognize the schedule extraction conditions.

The device scheduler 604 calculates unoccupied times of available printers between the start time and the completion time set in FIG. 12 (S2102). More particularly, as the schedule information (reservation information) of the available printers is stored in the RAM 202, the device scheduler 604 checks the reservation status in the RAM 202 thereby calculates the unoccupied times of the printers.

The device scheduler 604 determines whether or not "schedule with plural printers" is selected in the extraction conditions recognized at step S2101 (S2102).

If it is determined at step S2102 that "schedule with plural printers" is not selected, the device scheduler 604 compares processing amount necessary for processing the ordered document data with the processing amounts per unoccupied times of the respective printers, thereby extracts available candidate times (S2104). Note that the processing amounts per unoccupied times of the respective printers are obtained by the above-described calculation, and the result of the comparison between the processing amount for processing the document data and the processing amounts per unoccupied times of the respective printers is stored in the RAM 202.

Further, if it is determined at step S2102 that "schedule with plural printers" is selected, the device scheduler 604 compares a processing amount, obtained by combining the processing amounts per unoccupied times of the respective printers calculated at step S2102, with the processing amount for processing the ordered document data. Then, the device scheduler 604 extracts combinations of available candidate times based on the result of comparison (S2105). Note that the details of the processing at step S2105 will be described with reference to FIGS. 22 and 23.

The device scheduler 604 determines whether or not candidate times have been extracted at steps S2104 and S2105 (S2106). More particularly, as candidate times extracted at steps S2104 and S2105 are stored in the RAM 202, the device scheduler 604 refers to the RAM 202 thereby determines whether or not candidate times have been extracted.

If it is determined at step S2106 that candidate times have been extracted, the device scheduler 604 displays the candidate times in accordance with the display conditions set in FIG. 12 (S2107). The display of candidate times will be described with reference to FIG. 29.

Further, if it is determined at step S2106 that no candidate time has been extracted, the device scheduler 604 extracts secondary candidate times based on priority to be described later from unoccupied times which did not meet the processing amount necessary to process the ordered document data. More particularly, unoccupied times or combinations of unoccupied times which were not extracted at steps S2104 and S2105 are the secondary candidate times. The device scheduler 604 displays the secondary candidate times in accordance with the priority set for the extraction condition items (S2108). Note that the details of the display will be described with reference to FIG. 26.

As the candidate times are extracted in accordance with the extraction conditions set by the user, a schedule for execution of printing can be determined from the candidate times projecting the user's intention.

Figure 23:
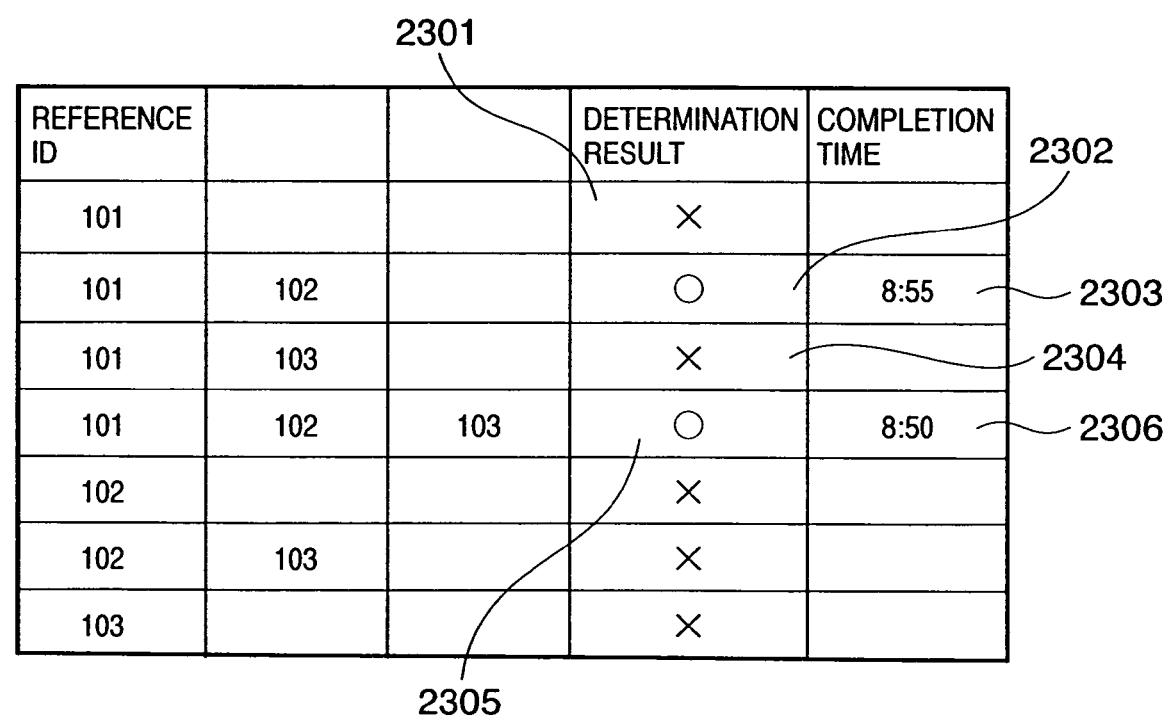

Next, the processing at step S2105 will be more particularly described with reference to FIGS. 22 and 23. Note that in this example, a print order to output 8 copies of 100-page printed result (processing amount=800 sheets) by 9 o'clock from ordered document data has been placed. Further, in this example, printers having device IDs 101, 102 and 103 (hereinbelow, printers 101 to 103) are available, and the operator allows use of plural printers.

First, unoccupied times and processing abilities of the respective printers which have been determined as printers with unoccupied times at step S2102 are stored as shown in FIG. 22. Then, the device scheduler 604 extracts all the combinations of printers determined as printers with unoccupied times, and determines whether or not they can process the ordered document data. FIG. 23 shows the results of determination.

The device scheduler 604 designates a printer as a reference printer from the printers determined as printers with unoccupied times. In this example, the printer 101 is designated as a reference printer. Then, the device scheduler 604 compares the processing amount of the printer 101, 600 sheets, with the processing amount for processing the ordered document data, 800 sheets. As a result, the device scheduler 604 determines that the document data cannot be processed with the one printer 101, and stores a determination result 2301 into the RAM 202.

Next, the device scheduler 604 sets a combination of the reference printer 101 and the printer 102. As a result, the processing amount per unoccupied time is 900 sheets, and the device scheduler determines that the processing amount, 800 sheets, of the ordered document data, can be processed. The device scheduler 604 stores a determination result 2302 into the RAM 202. Note that completion time 2303 may be also stored as the determination result.

The device scheduler 604 sets a combination of the reference printer 101 and the printer 103 as the next combination. As a result, the processing amount per unoccupied time is 750 sheets. The device scheduler 604 determines that the processing amount, 800 sheets, of the ordered document data, cannot be processed. The device scheduler 604 stores a determination result 2304 into the RAM 202.

The device scheduler 604 sets a combination of the reference printer 101, the printer 102 and the printer 103. As a result, the processing amount per unoccupied time is 1050. The device scheduler 604 determines that the processing amount, 800 sheets, of the ordered document data, can be processed. The device scheduler 604 stores a determination result 2305 into the RAM 202. Similar processing is performed regarding all the combinations using the reference printer, and determination results are stored into the RAM 202.

By the above processing, it is determined that the processing by the combination of the printer 101 and the printer 102, and the processing by the combination of the printer 101, the printer 102 and the printer 103, are available for processing the ordered document data. In this manner, in a case where processing using plural printers is set at step S2105, candidate time(s) obtained by combinations of available printers to process ordered document data can be extracted. Accordingly, more various candidate times than processing using one printer can be extracted.

Next, the processing at step S2108 of FIG. 21, which is performed in a case where no candidate time exists, will be described with reference to FIG. 21. When the extraction conditions are set in FIG. 12, priority can be set. FIG. 24 shows a user interface screen at that time.

The UI screen in FIG. 24 is basically the same as that in FIG. 12. However, in FIG. 24, a priority setting screen is displayed in correspondence with setting of extraction conditions. For example, a setting screen 2402 for priority setting in correspondence with checking of a radio button 2401 and setting of completion time, such that a priority can be set for an extraction condition 2401. In this manner, in corresponding to setting of extraction conditions, priorities can be set for the respective extraction conditions. Further, the respective extraction conditions and priorities are associated with each other when they are stored as shown in FIG. 25.

Next, the extraction of secondary candidate times will be described with reference to FIG. 26. Note that the secondary candidate time means candidate time which meets a part of the set extraction conditions.

The device scheduler 604 extracts printers with unoccupied times and combinations of printers with unoccupied times (S2601). The printers with unoccupied times can be extracted by the processing at step S2102. Further, the combinations of printers with unoccupied times include at least 2 extracted printers with unoccupied times. At step S2601, all the combinations of printers with unoccupied times are extracted.

The device scheduler 604 stores the total number of printers with unoccupied times and combinations of printers with unoccupied times extracted at step S2601 as S. Further, the device scheduler 604 stores the total number of priorities set by the above processing as m (S2602).

For sequential determination of the printers with unoccupied times or combinations of printers with unoccupied times, the device scheduler 604 sets the order for determination of the printers with unoccupied times or combinations of printers with unoccupied times as n, and the priority of determination as p (S2603), and initializes them (S2604).

The device scheduler 604 determines whether or not the n-th printer or combination of printers satisfies extraction condition with the priority p (S2605). More particularly, predicted processing results, obtained from the processing abilities and unoccupied times of the printers extracted at step S2601, are held as shown in FIG. 27. Accordingly, by comparing the extraction condition with the priority p with the predicted result in FIG. 27, the determination processing at step S2605 can be performed.

As a result of the processing at step S2605, if it is determined that the extraction condition with priority p is satisfied (Yes at step S2605), the device scheduler 604 determines whether or not the n (the number of printers with unoccupied time or combination of printers with unoccupied times) is greater than the total number S set at step S2602 (S2606).

If No at step S2606, the device scheduler 604 determines whether or not there is remaining extraction condition(s) to be subjected to determination (S2607). If it is determined at step S2607 that another extraction condition to be subjected to determination exists, the device scheduler 604 performs increment processing (S2608) for determination of extraction condition with the next priority.

Further, if it is determined at step S2607 that no remaining extraction condition exists, the device scheduler 604 performs increment processing on the printer with unoccupied time or combination of printers with unoccupied times as the determination subject, thereby updates the determination subject (S2609). As the updated determination subject is subjected to determination from extraction condition with priority "1", the device scheduler 604 performs initialization of priority (S2610).

The device scheduler 604 stores the results of processing at steps S2601 to S2610 in the RAM 202 as shown in FIG. 27. The device scheduler 604 displays secondary candidate times from the processing results in accordance with the priority order (S2611). More particularly, the device scheduler 604 displays secondary candidate times satisfying many of extraction conditions with high priorities. Further, as another way of display, it may be arranged such that high points are assigned to extraction conditions with high priorities, and point addition processing is performed based on whether or not the extraction conditions are satisfied, then the candidate times are displayed in order of total point value.

Next, the processing in FIG. 26 will be described more particularly with reference to FIG. 27. In this example, as extraction conditions for processing ordered document data, the start time is 8:00, the completion time is 9:00, and the number of printers is 1. The priority of the completion time is 1, and that of the start time, 2. The priority of "processing by 1 printer" is 3.

As printers with unoccupied times, printers with device IDs 101, 102 and 103 (printers 101 to 103) are extracted, and as a result of combining the respective printers, the total number S of printers with unoccupied times and combinations of printers with unoccupied times as determination subjects is 7.

Figure 26:
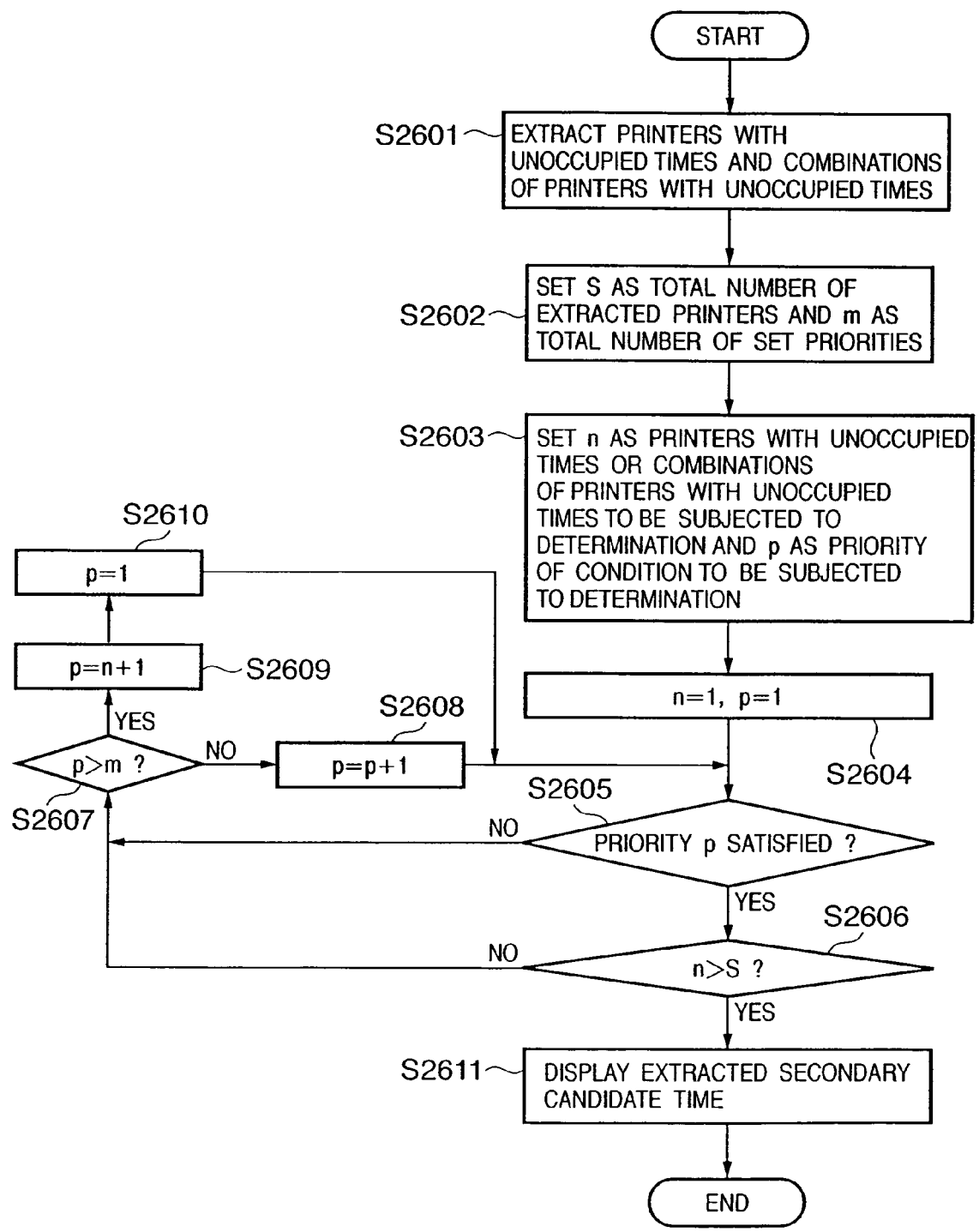
FIG. 26 is a flowchart showing extraction of secondary candidate time.

The device scheduler 604 performs determination processing in FIG. 26 from the first determination subject (printer 101 in FIG. 27). As a result, the printer 101 does not satisfy the completion time 9:00 with the priority 1 (No at step S2605), but remaining extraction conditions exist (No at step S2607), it is determined whether or not the printer 101 satisfies the start time 8:00 with the next priority 2 (S2605). As a result, it is determined that the printer 101 satisfies the extraction condition with the priority 2. FIG. 27 shows the result of determination regarding the printer 101 by the determination of the extraction conditions with the priorities 1 to 3.

Next, determination is made for the combination of the printer 101 and the printer 102. Note that for the sake of simplicity of explanation, the combination of the printer 101 and the printer 102 will be referred to as a "combination 1" hereinafter. Regarding the combination 1, the processing time is from 8:00 to 8:55 by the combination of the plural printers. Accordingly, as it is determined that the combination 1 satisfies the extraction conditions with priorities 1 and 2 but does not satisfy the extraction condition with priority 3, the result of determination is as shown in FIG. 27. The above processing is performed for all the extracted 7 determination subjects.

Next, the device scheduler 604 displays secondary candidate times from a secondary candidate time which satisfies the most extraction conditions with high priorities. FIG. 28 shows the result of display.

In FIG. 27, the determination subjects satisfying the completion time 9:00 with the priority 1 are subjects n=4 and n=2. Further, in FIG. 24, "display from the earliest print completion time" is selected as the display condition. In FIG. 28, a schedule 2801 corresponding to the determination subject n=4 with early print completion time is first displayed. Next, as the determination subject n=2 satisfies the completion time 9 with the priority 1, a schedule 2802 corresponding to the determination subject n=2 is displayed. Although the next determination subject corresponding to the completion time 9 with the priority 1 does not exit, the determination subjects n=1 and n=7 satisfy the start time with the priority 2 and the "schedule with one printer" with the priority 3. As the print completion time of the determination subject n=1 is earlier than that of the determination subject n=7, a schedule 2803 corresponding to the determination subject n=1 is displayed. Further, it may be arranged such that the display order is determined based on assigned points. In this case, every time each determination subject satisfies an extraction condition, points corresponding to the priority are added. For example, assuming that the extraction condition with priority 1 have points "+3", the extraction condition with priority 2, "+2", and the extraction condition with priority 3, "+1", every time each determination subject satisfies one of the extraction conditions, the points are added, and schedules are displayed from one corresponding to a determination subject with the highest score.

In this method, even if merely a part of the extraction conditions set by the operator is satisfied, a schedule projecting the operator's intention as much as possible can be generated.

Next, the processing at step S2107 will be described with reference to FIG. 29.

The device scheduler 604 reads the display condition set in FIG. 12 from the RAM 202 and analyzes the condition (S2901).

The device scheduler 604 analyzes the candidate times extracted at step S2104 or S2105 and held in the RAM 202 (S2902). Note that the information analyzed at step S2902 is based on the display condition analyzed at step S2901. For example, in a case where "from the earliest print completion time" is set as the display condition, the completion times of the respective candidate times are analyzed. Further, in a case where "from the least number of printers" is set as the display condition, the numbers of printers necessary for printing are analyzed.

The device scheduler 604 determines the display order of the respective candidate times in accordance with the display condition (S2903), and displays the candidate times in accordance with the determined display order (S2904).

Figure 29:
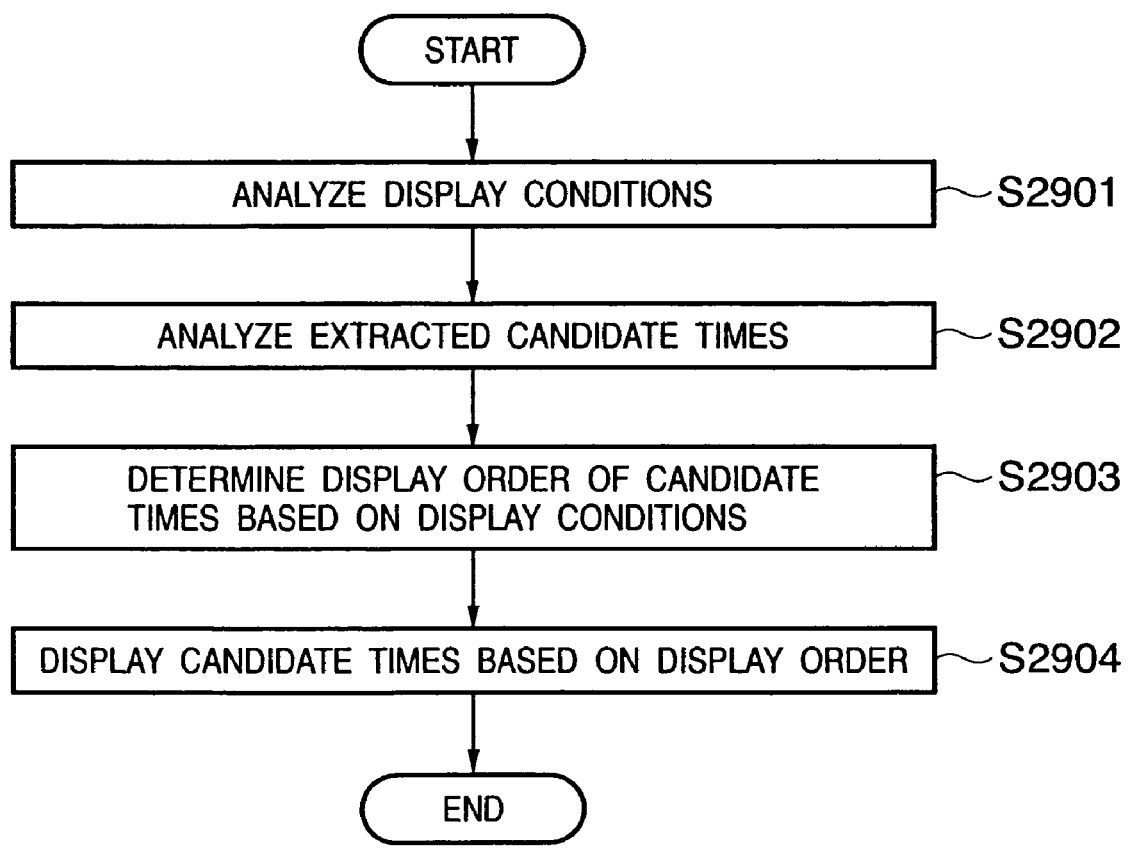
FIG. 29 is a flowchart showing processing at step S2107 in the flowchart of FIG. 21.

As the candidate times are displayed in accordance with the display condition set as shown in FIG. 29, even when a large number of candidate times are extracted, desirable schedule candidate times are displayed in higher ranks. Accordingly, oversight of such desired schedules can be prevented.

(Print Component)

Regarding a reserved schedule, when time to start processing has come, the device scheduler 604 notifies the workflow manager 603 of the processing start time, and sets the process of print processing to in-process status. Note that the processing start time of the schedule indicates the earliest time to start the processing among the schedule candidate times forming the schedule. Then the workflow manager 602 starts the print component 606 (these operations may be manually performed by the operator).

The print component 606 is a component to transmit a print job to the printers 111 and 112. The print component 606 obtains registered document data and print information from the order information in the order manager 601, and generates one or more print jobs for print processing by the printers in accordance with the schedule. Then the print component 606 transmits the print job so as to start printing by the printers 111 and 112.

The device scheduler 604, the workflow manager 602 and the print component 606 are mutually communicable programs. Accordingly, all the works from schedule selection to printing can be automated, and the load on the operator can be reduced.

Note that the functions of the device scheduler 604, the workflow manager 602, the print component 606 and the like may be partially performed by the operator. For example, it may be arranged such that the operator operates the workflow manager 602 based on schedule information managed by the device scheduler 604, to manage the progress of workflow. Otherwise, it may be arranged such that in correspondence with an event where the progress of workflow managed by the workflow manager 602 has been changed, the print component 606 obtains registered document data and print information from order information in the order manager 601 and transmits the obtained information to the operation PC 106, and the operator sends a print job generated from the document data from the operation PC 106 to the printer.

(Job Manager)

When printing has been started, the job manager 603 as a component to manage the print job communicates with the printers 111 and 112 thereby monitors the print job.

As the operator can access the job manager 603 from the operation PC 106, the operator can obtain the status of the print job in process and control the print job. FIG. 15 shows an example of an operation screen 1501 of the job manager 603 displayed on the operation PC 106.

The job manager 603 displays information on the status of the print job in processing on a status screen 1502 of the operation screen 1501. The information on the status of print job includes a document name attached to the document data, the status of print job (in-output, wait for output, in abeyance and the like), the job reception time, and the like. The job manager 603 sequentially changes the display contents of the status screen 1502 in accordance with the progress of print job, trouble in the printers 111 and 112 or the like. Further, the operator can select a desired print job, and can perform operation such as print stopping, print restart and print cancellation.

In this arrangement, the operator can check the status of print job from the operation PC 106 or manually change the print status at a desired time point.

(Device Manager)

Next, the device manager 605 as a component to manage the printing devices such as the printers 111, 112 and the bookbinding devices 141 and 142 will be described. FIGS. 16 and 17 show examples of operation screen displayed on the operation PC 106 upon access to device manager 605 from the operation PC 106.

The device manager 605 manages installation information (network address and administrator) of the printing devices including the printers 111 and 112 and the bookbinding devices 141 and 142. The device manager 605 periodically performs communication with the printing devices, obtains status information (operating status, error/warning status and the like), and stores and manages the information in a storage device such as the HD 205. Further, the operator can check these information by accessing the device manager 605 from the operation PC 106. FIG. 16 shows an example of the device manager 605 which list-displays the installation information of the respective printers.

Further, the device manager 605 periodically performs communication with the printers 111 and 112 and the bookbinding devices 141 and 142, obtains device information of the printing devices, and stores and manages the information in a storage device such as the HD 205. The device information includes ability information (processing speed per unit time, finishing functions such as bookbinding/stapling/punching), consumable supply information (paper/toner/staples and the like). These information are accessible in accordance with requests from the other components (device scheduler 604 and the like) of the print management program. Further, the operator can check the information by accessing the device manager 605 from the operation PC 106. FIG. 17 shows an example of the device manager 605 which displays the consumable supply information (paper) of a predetermined printer.

Further, the device manager 605 has a function of sequentially notifying device information in accordance with requests from the order manager 601, the workflow manager 602, the job manager 603, the device scheduler 604 and the like.

As described above, the operator can check the status of printing device from the operation PC 106 at a desired time point. Further, the information on the printing devices can be effectively utilized in scheduling or the like by notification from the device manager 605 to the other components.

As described above, the present invention provides an information processing apparatus and its control method, and a computer program and a computer system which enable an operator to easily select a desired schedule by generating and presenting various operation schedule candidates based on unoccupied times of printing devices.

<Other Embodiments>

The embodiment of the present invention has been described in detail as above. The present invention can be implemented as a system, an apparatus, a method, a program or a storage medium. More particularly, the invention can be applied to a system constituted by a plurality of devices or to an apparatus comprising a single device.

Further, the invention can be implemented by supplying a software program, which implements the functions of the foregoing embodiment, directly or indirectly to a system or apparatus, reading the supplied program code with a computer of the system or apparatus, and then executing the program code.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or script data supplied to an operating system.

Example of storage media that can be used for supplying the program are a floppy disk (registered trademark), a hard disk, an optical disk, a magneto-optical disk, an MO, a CD-ROM, a CD-R, a CD-RW, a magnetic tape, a non-volatile type memory card, a ROM, and a DVD (a DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer. Besides the cases where the aforementioned functions according to the embodiment are implemented by executing the read program by computer, an operating system or the like running on the computer may perform all or a part of the actual processing so that the functions of the foregoing embodiment can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiment can be implemented by this processing.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priorities from Japanese Patent Application No. 2004-252900 filed on Aug. 31, 2004, and Japanese Patent Application No. 2005-228477 filed on Aug. 5, 2005, which are hereby incorporated by reference herein.

What is claimed is:

1. An information processing apparatus capable of communicating with a printer, comprising:
a first setting unit configured to set print completion time;
a second setting unit configured to set using a plurality of printers to print document data;
a third setting unit configured to set (1) using same type printers or (2) using the plurality of printers comprising a color printer and a monochrome printer;
a fourth setting unit configured to set a schedule display order based on one of (1) earliest print completion time, (2) least number of printers, and (3) most frequently used printer;
a generating unit configured to generate a plurality of print schedule candidates satisfying a setting content of first, second, third and fourth setting units; and
a display control unit configured to display a schedule screen for displaying the plurality of print schedule candidates generated by said generating unit, and is capable of accepting change of the display condition.

2. The apparatus according to claim 1, further comprising a determining unit configured to determine operation schedule of printers for the print data in accordance with a designation accepted through the schedule screen.

3. A control method for an information processing apparatus capable of communicating with a printer, comprising:
a first setting step of setting print completion time;
a second setting step of setting using a plurality of printers to print document data;
a third setting step of setting (1) using same type printers or (2) using the plurality of printers comprising a color printer and a monochrome printer;
a fourth setting step of setting a schedule display order based on one of (1) earliest print completion time, (2) least number of printers, and (3) most frequently used printer;
a generating step of generating a plurality of print schedule candidates satisfying a setting content of first, second, third and fourth setting units; and
a display control step of displaying a schedule screen for displaying the plurality of print schedule candidates generated in said generating step,
wherein the display step is capable of accepting change of the display condition.

4. The control method according to claim 3, further comprising a determining step of determining operation schedule of printers for the print data in accordance with a designation accepted through the schedule screen.

5. A non-transitory computer-readable medium storing a program for controlling an information processing apparatus capable of communicating with a printer, comprising:
a first setting module for setting print completion time;
a second setting module for setting using a plurality of printers to print document data;
a third setting module for setting (1) using same type printers or (2) using the plurality of printers comprising a color printer and a monochrome printer;
a fourth setting module for setting a schedule display order based on one of (1) earliest print completion time, (2) least number of printers, and (3) most frequently used printer;
a generating module for generating a plurality of print schedule candidates satisfying a setting content of first, second, third and fourth setting modules; and
a display control module for displaying a schedule screen for displaying the plurality of print schedule candidates generated in said generating module, wherein the display module is capable of accepting change of the display condition.

6. The non-transitory computer-readable medium storing a program according to claim 5, further comprising a determining module for determining operation schedule of printers for the print data in accordance with a designation accepted through the schedule screen.

* * * * *